(12) United States Patent
Imura

(10) Patent No.: US 7,339,665 B2
(45) Date of Patent: Mar. 4, 2008

(54) CALIBRATION SOURCE FOR CALIBRATING SPECTRORADIOMETER, CALIBRATION METHOD USING THE SAME, AND CALIBRATION SYSTEM

(75) Inventor: Kenji Imura, Toyohashi (JP)

(73) Assignee: Konica Minolta Sensing, Inc., Osaka (JP)

( * ) Notice: Subject to any disclaimer, the term of this patent is extended or adjusted under 35 U.S.C. 154(b) by 241 days.

(21) Appl. No.: 11/303,313

(22) Filed: Dec. 16, 2005

(65) Prior Publication Data
US 2006/0132760 A1 Jun. 22, 2006

(30) Foreign Application Priority Data
Dec. 22, 2004 (JP) .............................. 2004-371563

(51) Int. Cl.
*G01J 3/02* (2006.01)
*G01J 3/18* (2006.01)
(52) U.S. Cl. ................ 356/243.1; 356/243.8; 356/300; 356/328
(58) Field of Classification Search ............... 356/300, 356/326, 328, 243.1, 243.8
See application file for complete search history.

(56) References Cited

U.S. PATENT DOCUMENTS
2005/0041248 A1* 2/2005 Imura .......................... 356/328

FOREIGN PATENT DOCUMENTS
JP         06-074823       3/1994

* cited by examiner

*Primary Examiner*—F. L. Evans
(74) *Attorney, Agent, or Firm*—Brinks Hofer Gilson & Lione

(57) ABSTRACT

A spectroradiometer is calibrated by a calibration source including a plurality of monochromatic sources for emitting monochromatic rays having different wavelengths from each other, respectively; a reference light emitter for emitting monochromatic reference light by receiving the monochromatic rays emitted from the monochromatic sources; a reference sensor for measuring a reference intensity of the monochromatic reference light emitted from the reference light emitter; and a controller for controlling the emission of the monochromatic rays by the monochromatic sources, and the measurement of the reference intensity of the monochromatic reference light by the reference sensor.

17 Claims, 15 Drawing Sheets

CALIBRATION SOURCE FOR
CALIBRATING SPECTRORADIOMETER,
CALIBRATION METHOD USING THE
SAME, AND CALIBRATION SYSTEM

This application is based on Japanese Patent Application No. 2004-371563 filed on Dec. 22, 2004, the contents of which are hereby incorporated by reference.

BACKGROUND OF THE INVENTION

1. Field of the Invention

The present invention relates to a calibration source (light source) for calibrating a spectroradiometer that enables a user to easily perform spectral sensitivity calibration and wavelength calibration of the spectroradiometer without using a calibration source, e.g., a black body source, which requires provision and control of a strict calibration environment, as well as to a calibration method using the calibration source, and a calibration system.

2. Description of the Related Art

Heretofore, there have been widely known spectroradiometers for measuring and evaluating spectral radiances, radiances, and colors of various light sources and display devices. FIG. 14 is an illustration showing an arrangement of a spectral analyzer 70 in a conventional spectroradiometer. The spectral analyzer 70 is a so-called polychromator, in which light 701 to be measured is guided to an incident slit 712 through an objective optical system 711 for wavelength dispersion by a diffraction grating 713, and a wavelength-dispersed image of the incident slit 712 is formed on a photo detective sensor array 715 through an imaging optical system 714. Outputs from respective pixels of the sensor array 715 in accordance with a spectral intensity of the light 701 to be measured are sent to a control/processing unit 717 via a processing circuit 716 for conversion into spectral radiances. Thus, intensity distributions of all the wavelengths in a wavelength range to be measured are simultaneously measured.

There are two calibrations in the spectroradiometer, namely, wavelength calibration and spectral sensitivity calibration. The wavelength calibration is performed by storing a lookup table showing a correlation between the pixel number n of the respective pixels of the sensor array 715, and a center wavelength $\lambda_n$ of the pixel having the pixel number n. The spectral sensitivity calibration is performed by storing a ratio of a spectral intensity obtained when an incandescent source such as a tungsten lamp whose spectral radiance is known is measured by a spectroradiometer to be calibrated, to the known spectral radiance, as a sensitivity correction factor.

The spectroradiometer has suffered from wavelength fluctuation due to a change of an optical arrangement of a spectral analyzer incorporated in the spectroradiometer, or spectral sensitivity fluctuation resulting from change of a diffraction grating, an optical component, or a circuit element through aging despite the fact that the wavelength calibration and the spectral sensitivity calibration are carried out by the manufacturer at the time of production or at the time of shipment. In view of this, it is necessary to re-calibrate the spectroradiometer with sufficient frequency to maintain the measurement precision of the spectroradiometer after the shipment.

The spectral radiant emittance M ($\lambda$, T) of an incandescent calibration source used generally and conventionally for spectral sensitivity calibration of the spectroradiometer is given by the following Plank's equation where $C_1$ and $C_2$ are constants:

$$M(\lambda,T)=C_1 \cdot \lambda^{-5} \exp[1-C_2/(\lambda \cdot T)] \quad (1)$$

The spectral radiant emittance greatly depends on the color temperature T of the light source relatively and absolutely. In view of this, it is necessary to (a) finely control the color temperature of the light source, or (b) monitor the color temperature of the light source to use the incandescent calibration source as calibration reference. In the case of (b), at least two reference sensors having different spectral sensitivities from each other are necessary to monitor the color temperature of the light source.

Assuming a case to maintain a radiant intensity at a wavelength of 400 nm of an incandescent calibration source having a color temperature of 2,800K within a fluctuation of ±1%, in the case of (a), it is necessary to control the temperature of the light source with a precision of ±2K, and in the case of (b), it is necessary to keep a wavelength fluctuation of a spectral sensitivity of the reference sensor provided with a filter having a temperature dependence or a time-based variation within 0.5 nm or less. Since the conventional calibration source requires special arrangement in maintaining precision, it is substantially impossible for a user to re-calibrate or correct spectral sensitivity of the spectroradiometer. In view of the above, it is a general practice for the user to return the spectroradiometer to a manufacturing factory, a servicing facility, or a like site for re-calibration of the spectral sensitivity thereof. However, a cost and time are required for the returning, and therefore, it is difficult to perform re-calibration with sufficient frequency.

SUMMARY OF THE INVENTION

It is an object of the present invention to provide a calibration technology that is free from the problems residing in the prior art.

It is another object of the present invention to provide a calibration source that enables a user to perform wavelength calibration and spectral sensitivity calibration of a spectroradiometer, which have been generally performed in a manufacturing factory, a servicing facility, or a like site in the conventional art, as well as a calibration method, and a calibration system.

According to an aspect of the invention, a spectroradiometer is calibrated by a calibration source comprising a plurality of monochromatic sources for emitting monochromatic light having different wavelengths from each other, respectively; a reference light emitter for emitting monochromatic reference light by receiving the monochromatic light emitted from the monochromatic sources; a sensor for measuring a reference intensity of the monochromatic reference light emitted from the reference light emitter; and a controller for controlling the emission of the monochromatic light by the monochromatic sources, and the measurement of the reference intensity of the monochromatic reference light by the sensor.

The calibration is performed by turning on the monochromatic sources, measuring the monochromatic reference light emitted from the reference light emitter by the spectroradiometer to output a spectral radiance of the monochromatic reference light, measuring the reference intensity of the monochromatic reference light emitted from the reference light emitter by the sensor to calculate a reference spectral radiance of the monochromatic reference light based on the measurement result, and correcting a sensitivity of the spectroradiometer at the wavelength of the monochromatic reference light, based on the measured spectral radiance and the reference spectral radiance of the monochromatic reference light.

These and other objects, features and advantages of the present invention will become more apparent upon reading of the following detailed description along with the accompanying drawings.

DETAILED DESCRIPTION OF THE PREFERRED EMBODIMENTS OF THE INVENTION

Figure 1:
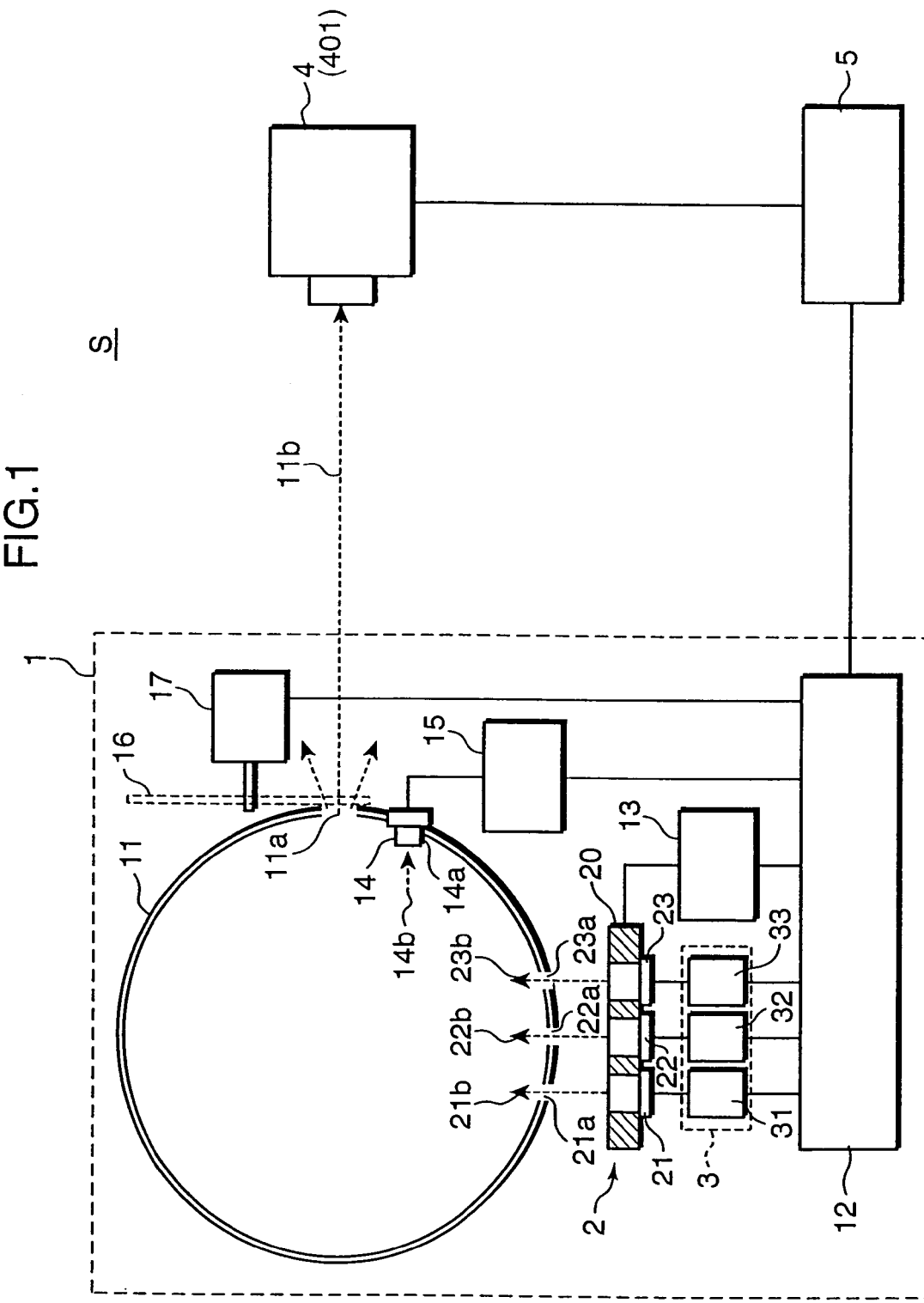
FIG. 1 is a system block diagram showing a construction of a calibration system using a calibration source for calibrating a spectroradiometer in accordance with a first embodiment of the invention.

In the following, embodiments of the invention are described referring to the drawings.

First Embodiment

Figure 2:
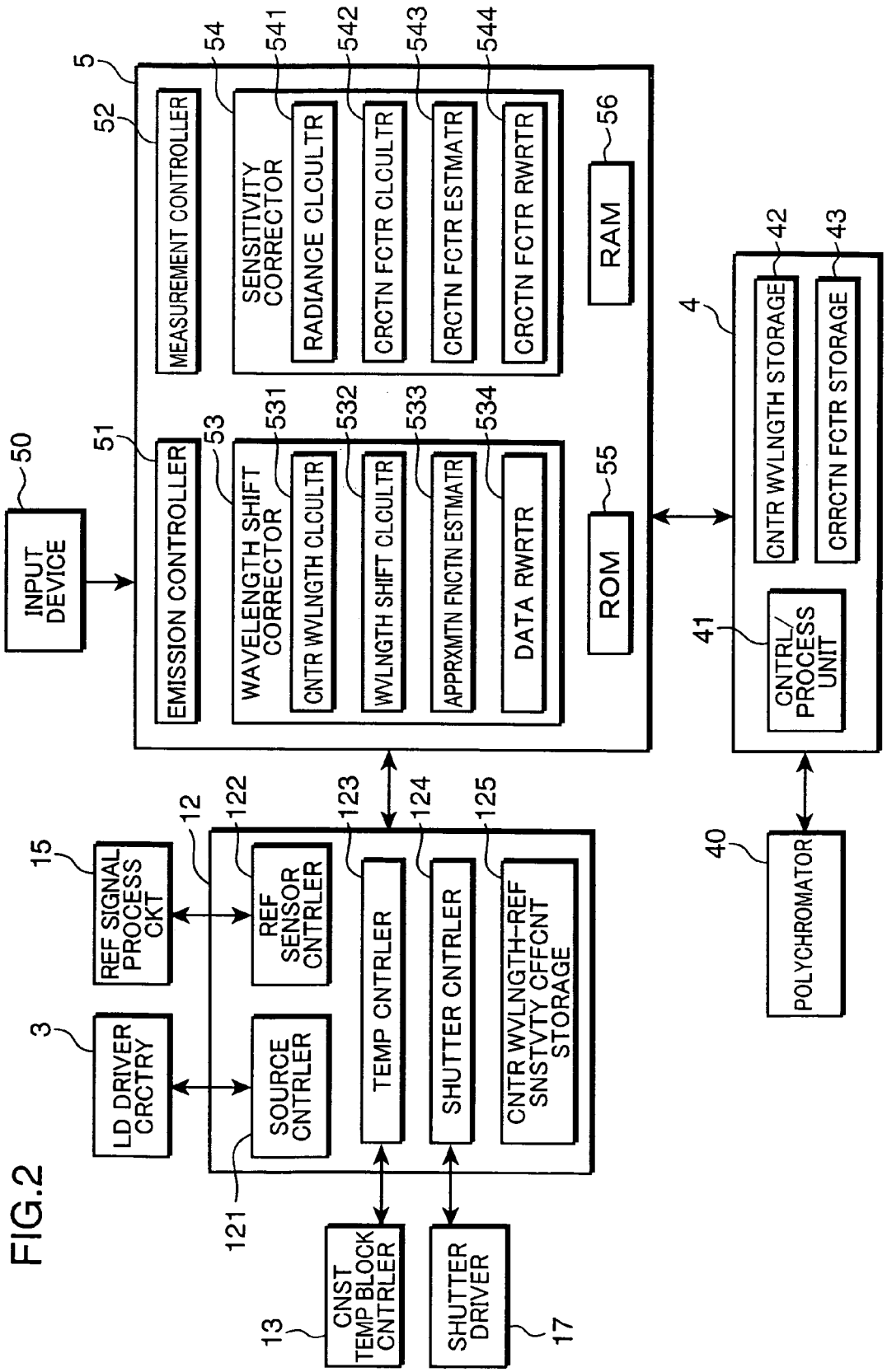
FIG. 2 is a functional block diagram showing a functional arrangement of the calibration system shown in FIG. 1.

FIG. 1 is a system block diagram showing a construction of a calibration system S using a calibration source for calibrating a spectroradiometer in accordance with a first embodiment of the invention. FIG. 2 is a functional block diagram showing a functional arrangement of the calibration system S. The calibration system S includes a calibration source 1 for calibrating a spectroradiometer 4, the spectroradiometer 4 to be calibrated, and a personal computer 5 (hereinafter called as "control PC 5") for controlling the calibration system S.

The calibration source 1 includes an integrating sphere 11, a control/processing unit 12, a reference sensor 14, a laser unit 2, a laser (LD) driver circuitry 3, and a shutter 16. The integrating sphere 11 has a highly reflective and highly diffusive inner wall, with three incident apertures 21a, 22a, and 23a, and one exit aperture 11a. The integrating sphere 11 is designed in such a manner that light incident through the incident apertures 21a, 22a, and 23a is iteratively and diffusely reflected on the inner wall of the integrating sphere 11 so that homogenized light is exits through the exit aperture 11a. The integrating sphere 11 has a sensor aperture 14a near the exit aperture 11a for mounting the reference sensor 14.

The control/processing unit 12 controls measurement by the reference sensor 14, emission of the laser unit 2, namely, driving of the LD driver circuitry 3, and driving of the shutter 16. The control/processing unit 12 will be described later in detail.

The reference sensor 14 is a single semiconductor photo detector composed of a silicon photodiode, for instance. A photosensitive surface of the reference sensor 14 faces the inner wall of the integrating sphere 11 through the sensor aperture 14a. In other words, the photosensitive surface of the semiconductor photo detector is oriented toward the interior of the integrating sphere 11 in a bare state without intervening of a filter or the like element. The reference sensor 14 is adapted to monitor radiance of monochromatic reference light emerging through the exit aperture 11a. The integrating sphere 11 is so constructed as to allow monitoring light 14b which has been iteratively reflected by the inner wall of the integrating sphere 11 to be incident onto the photosensitive surface of the reference sensor 14. The reference sensor 14 is connected to a reference signal processing circuit 15. The reference signal processing circuit 15 converts a reference signal detected by the reference sensor 14 into reference data for outputting to the control/processing unit 12.

The laser unit 2 includes three semiconductor lasers 21, 22, and 23 or monochromatic sources, a constant temperature block 20 such as an aluminum block for fixedly supporting the semiconductor lasers 21, 22, and 23 thereon, and a constant temperature block controller 13 for keeping the temperature of the constant temperature block 20 constant. Emerging ends of the semiconductor lasers 21, 22, and 23 are opposed to the incident apertures 21a, 22a, and 23a of the integrating sphere 11, respectively so that laser output rays 21b, 22b, and 23b or monochromatic rays emanated from the semiconductor lasers 21, 22, and 23 are allowed to be incident into the integrating sphere 11.

Figure 3:
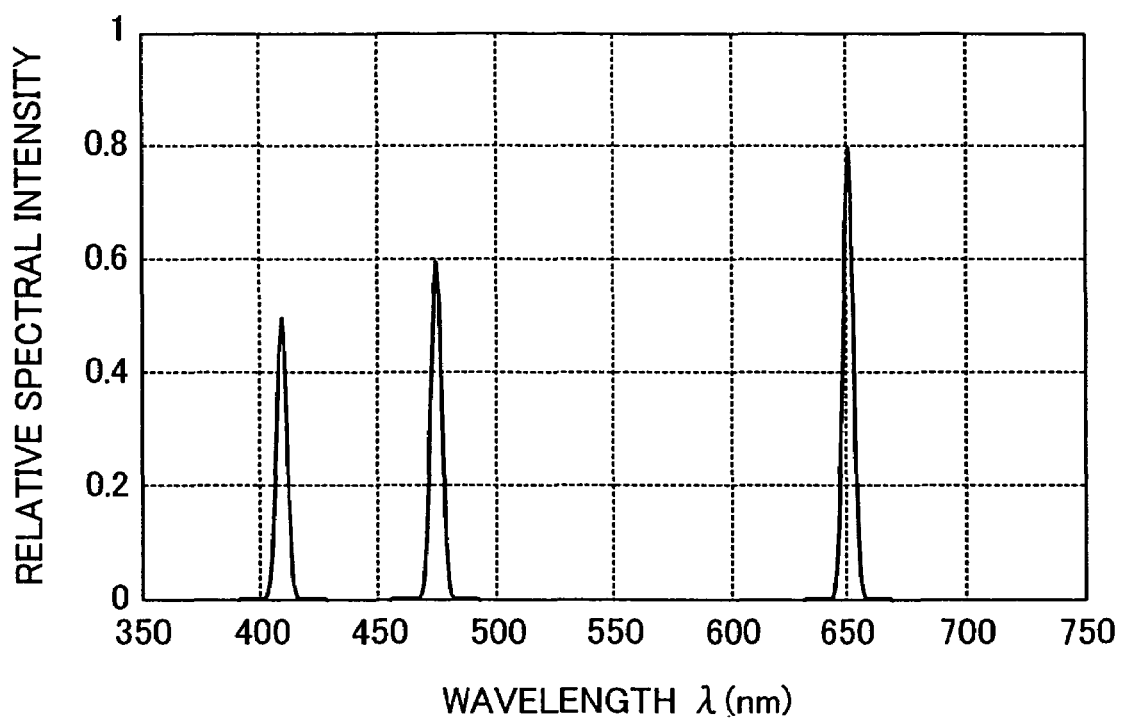
FIG. 3 is a graph showing an example of relative spectral intensities of monochromatic reference lights emitted from three semiconductor lasers.

Output wavelengths of the semiconductor lasers 21, 22, and 23 are different from each other to generate monochromatic reference lights of different wavelengths. The output wavelengths can be arbitrarily selected. For instance, it is possible to use semiconductor lasers having peak wavelengths at 408 nm, 473 nm, and 650 nm, respectively, as shown in FIG. 3, to cover a visible range, two of which are in the short wavelength range where large sensitivity fluctuation is supposed to occur. This embodiment shows a case of using the three semiconductor lasers. Alternatively, it is possible to use two or more than three semiconductor lasers or other monochromatic sources having output wavelengths different from each other.

The constant temperature block 20 is formed with through-holes for fittingly holding metallic casings of the semiconductor lasers 21, 22, 33 therein, respectively. A Pertier thermoelectric device (not shown) for keeping the temperatures of the semiconductor lasers 21, 22, and 23 constant is mounted on the constant temperature block 20. Input to the Pertier thermoelectric device is controlled by the constant temperature block controller 13. Specifically, the constant temperature block controller 13 keeps the temperature of the constant temperature block 20 constant by controlling an input to the Pertier thermoelectric device in accordance with the temperature of the constant temperature block 20.

Generally, the output wavelength of the semiconductor laser has a temperature dependence of 0.2 nm/° C. or less. Mounting the semiconductor lasers 21, 22, and 23 on the constant temperature block 20 whose temperature is controlled by the Pertier thermoelectric device enables to keep the temperatures of the semiconductor lasers 21, 22, and 23 within ±1° C., which enables to suppress fluctuation of the output wavelength within 0.2 nm. In this arrangement, intended wavelength stability is secured with use of a compact and inexpensive semiconductor laser having a slight temperature dependence of output wavelength, as a monochromatic source.

The LD driver circuitry 3 includes three LD drivers 31, 32, and 33 for driving the semiconductor lasers 21, 22, and 23, respectively. The LD drivers 31, 32, and 33 generate drive signals for turning on the respective semiconductor lasers 21, 22, and 23 based on a laser control signal generated by the control/processing unit 12.

The shutter 16 is a dust protection shutter which normally closes the exit aperture 11a of the integrating sphere 11 ("closed state") to prevent dust intrusion, and opens the exit aperture 11a ("opened state") when measurement is performed by the spectroradiometer 4. The shutter 16 is operative to open and close the exit aperture 11a by a shutter driver 17 equipped with an electric motor. The shutter driver 17 is controlled in response to a control signal sent from the control/processing unit 12 when needed.

Figure 4A:
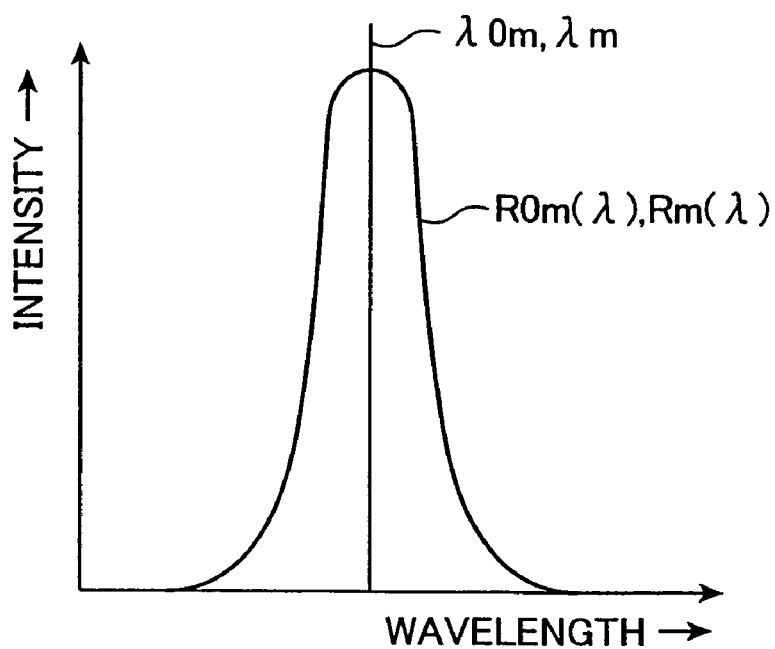
FIGS. 4A and 4B are graphs each showing an example of a profile of a spectral radiance $R_m(\lambda)$ of a monochromatic reference light measured by the spectroradiometer.

In the above arrangement, when the semiconductor lasers 21, 22, and 23 are successively turned on by the control/processing unit 12, the output rays 21b, 22b, and 23b from the semiconductor lasers 21, 22, and 23 are iteratively reflected by the inner wall of the integrating sphere 11, and diffusely radiated through the exit aperture 11a as monochromatic reference light 11b. The monochromatic reference light 11b is incident onto the spectroradiometer 4 or a reference spectroradiometer 401 and the spectral radiance is measured when calibrating spectrodiometer 4 or calibration source respectively. FIG. 4A is a graph showing an example of a spectral profile $R_m(\lambda)$ of monochromatic reference light measured by the spectroradiometer 4. It is possible to obtain a peak wavelength $\lambda_m$ by performing a computation using the profile $R_m(\lambda)$ of the spectral radiance. For instance, when a monochromatic reference light of 408 nm is measured by the spectroradiometer 4, a difference of a peak wavelength $\lambda_m$ obtained based on the profile of the measured spectral radiance from 408 nm is acquired as wavelength shift data.

Also, when the semiconductor lasers 21, 22, and 23 are successively turned on by the control/processing unit 12, the monitoring light 14b is incident onto the reference sensor 14 along with the emission of the monochromatic reference light 11b. Thus, reference data relating to radiance of the monochromatic reference lights originated from the respective semiconductor lasers 21, 22, and 23 is acquired.

Figure 5:
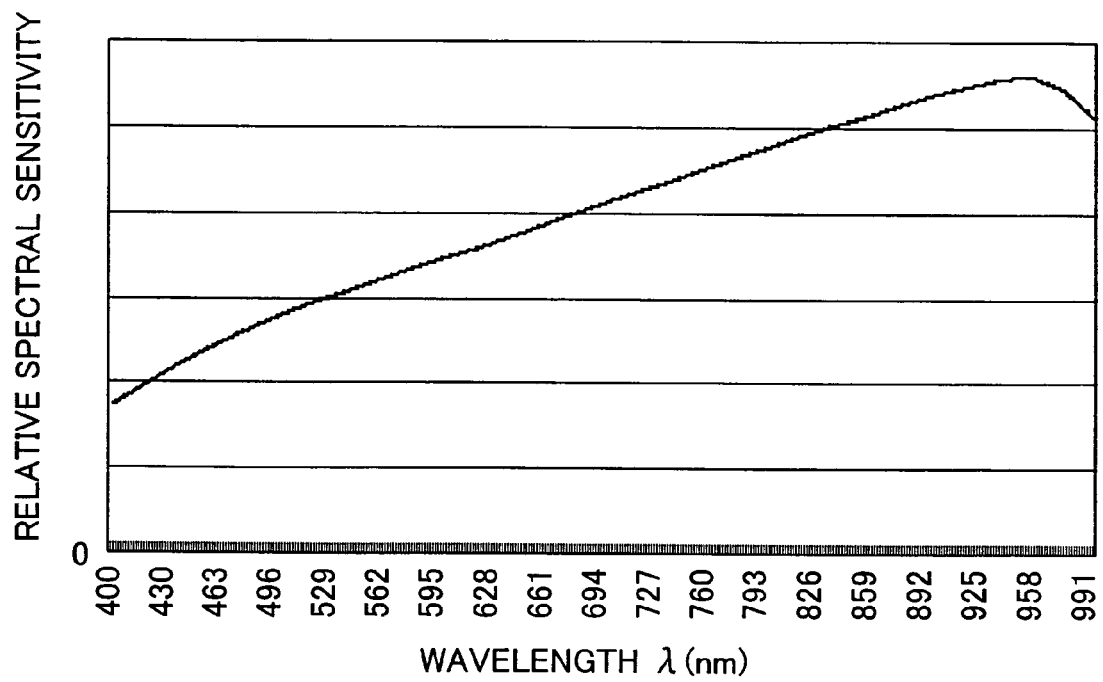
FIG. 5 is a graph showing an example of a relative spectral sensitivity of a silicon photodiode as a preferred example of a reference sensor.

FIG. 5 shows an example of a relative spectral sensitivity of a silicon photodiode, which is a preferred example of the reference sensor 14. Precision and stability in monitoring the spectral radiance of light depend on precision and stability of the spectral sensitivities of reference sensors in the case where incandescent calibration source is used in calibration, as in a conventional art. In the calibration source 1 in accordance with the embodiment, since the reference light has a line spectrum as shown in FIG. 3, the relative spectral intensity of the reference light is substantially free from fluctuation as long as the output wavelength is stable. Also, since the reference light is monochromatic, it is possible to monitor the reference intensity with whatever spectral sensitivity of the reference sensor 14. Therefore, it is possible to monitor the reference intensity by a single bare silicon photodiode free from fluctuation factors such as a filter which is highly likely to change characteristic with time or temperature. The calibration source 1 comprised of the monochromatic reference light and the bare silicon photodiode having high stability in spectral sensitivity enables to realize monitoring of radiance with high precision and high stability.

Figure 4B:
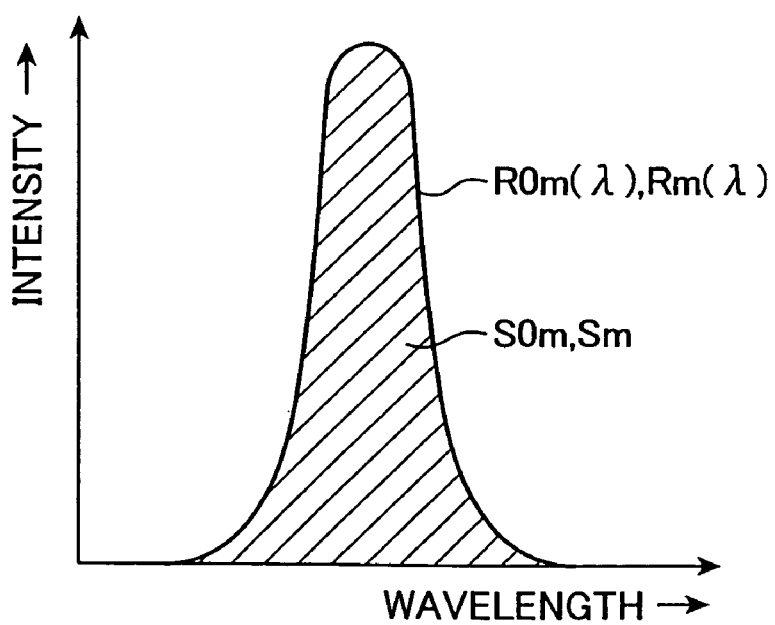

Sensitivity correction is performed by comparing a reference radiance which has been obtained based on the reference intensity detected by the reference sensor 14 with the radiance obtained by measuring the same monochromatic reference light by the spectroradiometer 4. As shown in FIG. 4B, the radiance to be compared with the reference radiance is acquired by calculating an area $S_m$ of spectral radiance $R_m(\lambda)$ of the monochromatic reference light measured by the spectroradiometer 4.

The control/processing unit 12 controls operations of the respective components of the calibration source 1 in response to a command signal from the control PC 5. As shown in FIG. 2, the control/processing unit 12 functionally includes a source controller 121, a reference sensor controller 122, a temperature controller 123, a shutter controller 124, and a center wavelength-reference sensitivity coefficient storage 125.

The source controller 121 generates a control signal to the LD driver circuitry 3 to successively turn on the respective semiconductor lasers 21, 22, and 23 in accordance with a measurement sequence outputted from the control PC 5.

The reference sensor controller 122 causes the reference signal processing circuit 15 to receive a reference signal from the reference sensor 14 when turning on the respective semiconductor lasers 21, 22, and 23 in accordance with the measurement sequence. By performing a predetermined process, the reference sensor controller 122 acquires reference data relating to the radiance of the monochromatic reference light from the reference signal processing circuit 15. The reference data is outputted to the control PC 5.

The temperature controller 123 acquires information of the temperature of the constant temperature block 20 from an unillustrated temperature sensor, generates a control signal to keep the temperature of the constant temperature block 20 constant, and controls input signal to the Pertier thermoelectric device via the constant temperature block controller 13. The shutter controller 124 generates a control signal to control the shutter driver 17 to open or close the exit aperture 11a of the integrating sphere 11 in accordance with the measurement sequence.

The center wavelength-reference sensitivity coefficient storage 125 stores therein a reference center wavelength $\lambda 0_m$ obtained by measuring monochromatic reference lights originated from the semiconductor lasers $LD_m$ (m=1 to 3), i.e., the semiconductor lasers 21, 22, and 23 by the reference spectroradiometer 401, and a sensitivity coefficient $C0_m$ of the reference sensor 14 in correlation to the center wavelength $\lambda 0_m$, i.e., a ratio of the reference data to the radiance measured by the reference spectroradiometer 401, in other words, a coefficient for converting the reference data into the reference radiance.

Figure 14:
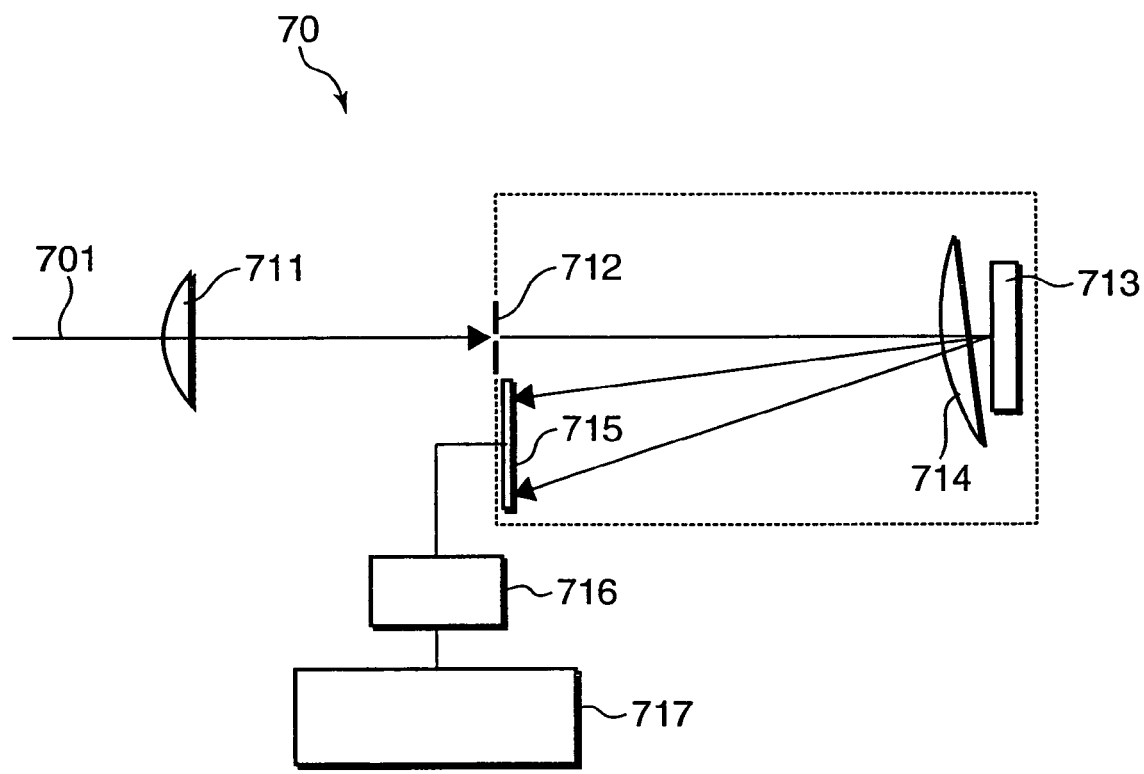
FIG. 14 is an illustration showing an arrangement of a spectral analyzer in a conventional spectroradiometer.

The spectroradiometer 4 includes a polychromator 40 having an optical arrangement as shown in FIG. 14, for instance, a control/processing unit 41, which corresponds to the control/processing unit 717 in FIG. 14, for controlling a measuring operation by the polychromator 40 and processing of measurement data, a center wavelength storage 42, and a correction factor storage 43.

The center wavelength storage 42 stores therein data showing a correlation between pixels constituting a sensor array of the polychromator 40, which corresponds to the sensor array 715 in FIG. 14, and center wavelengths of the respective pixels, i.e., a pixel-center wavelength table. The data is used to convert intensity distributions on pixels of the sensor array into spectral radiances, and is given initially at the time of production. If wavelength shift is detected after measurement for wavelength calibration, the data stored in the center wavelength storage 42 is replaced by new data reflecting the wavelength shift.

The correction factor storage 43 stores therein a correction factor for keeping the sensitivity to a unit radiance constant at each of the wavelengths in the wavelength range to be measured. The correction factor storage 43 stores therein initial data "1" for all the wavelengths in the wavelength range to be measured at the time of shipment. If sensitivity fluctuation is detected after measurement for spectral sensitivity calibration, the data stored in the correction factor storage 43 is replaced by a new correction factor which reflects the fluctuation.

The control PC 5 includes an input device 50 such as a mouse and a keyboard through which the operator controls the calibration procedure. The control PC 5 functionally includes a emission controller 51, a measurement controller 52, a wavelength shift corrector 53, a sensitivity corrector 54, and a data storage constituted of an ROM 55 and an RAM 56.

The emission controller 51 outputs a command to the source controller 121 of the control/processing unit 12 in accordance with the measurement sequence to control emissions of the semiconductor lasers 21, 22, and 23.

The measurement controller 52 outputs a command to the reference sensor controller 122 of the control/processing unit 12 in accordance with the measurement sequence, and functions as a command section for controlling measurement by the reference sensor 14. Also, the measurement controller 52 outputs a command to the control/processing unit 41 of the spectroradiometer 4 to measure the spectral radiance of the monochromatic reference light. Further, the measurement controller 52 outputs a command to temporarily store a result of the spectral radiance measurement by the spectroradiometer 4 in RAM 56, and outputs, to the respective components, other commands required for wavelength correction and spectral sensitivity correction.

The wavelength shift corrector 53 is a functional part for performing computation or the like process required for wavelength calibration of the spectroradiometer 4 to be calibrated, and includes a center wavelength calculator 531, a wavelength shift calculator 532, an approximation function estimator 533, and a data rewriter 534.

The center wavelength calculator 531 calculates a center wavelength based on the spectral radiance measurement result of the monochromatic reference light by the spectroradiometer 4 or by the reference spectroradiometer 401. The center wavelength may be calculated by a process of obtaining a wavelength corresponding to a peak intensity based on the profile of the spectral radiance $R_m(\lambda)$ as shown in FIGS. 4A and 4B, for instance.

The wavelength shift calculator 532 obtains a wavelength shift amount of the respective monochromatic reference lights originated from the semiconductor lasers 21, 22, and 23 by comparing the center wavelength obtained by the center wavelength calculator 531 with a given reference center wavelength of the monochromatic reference light. In this embodiment, the wavelength shift amount of the spectroradiometer 4 is calculated at each of the wavelengths of the monochromatic reference lights by comparative computation between the reference center wavelength $\lambda 0_m$ stored in the center wavelength-reference sensitivity coefficient storage 125 of the calibration source 1, and the center wavelength calculated by the center wavelength calculator 531.

The approximation function estimator 533 estimates a mathematical function for approximating the wavelength shift amount at each wavelength in the wavelength range to be measured, based on a relation between the wavelengths of the monochromatic reference lights, and the respective wavelength shift amounts obtained by the wavelength shift calculator 532, if the wavelength shift has occurred. It is possible to obtain a wavelength shift amount at the center wavelength of each of the pixels constituting the sensor array by using the approximation function.

The data rewriter 534 obtains a wavelength shift amount with respect to each of the pixels based on the approximation function obtained by the approximation function estimator 533, and creates a table showing a correlation between the respective pixels and the center wavelengths reflecting the wavelength shift. Then, the data rewriter 534 sends the table data to the spectroradiometer 4 to rewrite the pixel-center wavelength table stored in the center wavelength storage 42 into the newly created table.

The sensitivity corrector 54 is a functional part for performing a computation or the like process required for spectral sensitivity calibration of the spectroradiometer 4 to be calibrated, and includes a radiance calculator 541, a correction factor calculator 542, a correction factor estimator 543, and a correction factor rewriter 544.

The radiance calculator 541 calculates a radiance of each of the monochromatic reference lights originated from the semiconductor lasers 21, 22, and 23 based on the profile of the spectral radiance of the monochromatic reference light measured by the spectroradiometer 4 or by the reference spectroradiometer 401. The radiance may be calculated by calculating the area of the profile of the spectral radiance $R_m(\lambda)$ as shown in FIG. 4B, for instance.

The correction factor calculator 542 obtains a sensitivity variation with respect to each of the monochromatic reference lights by comparing the radiance of each of the monochromatic reference lights obtained by the radiance calculator 541 with the reference radiance obtained by multiplying the reference intensity of the same monochromatic reference light acquired by the reference sensor 14, by the reference sensitivity coefficient read out from the center wavelength-reference sensitivity coefficient storage 125 of the calibration source 1, and calculates a correction factor for correcting the sensitivity variation.

Figure 6:
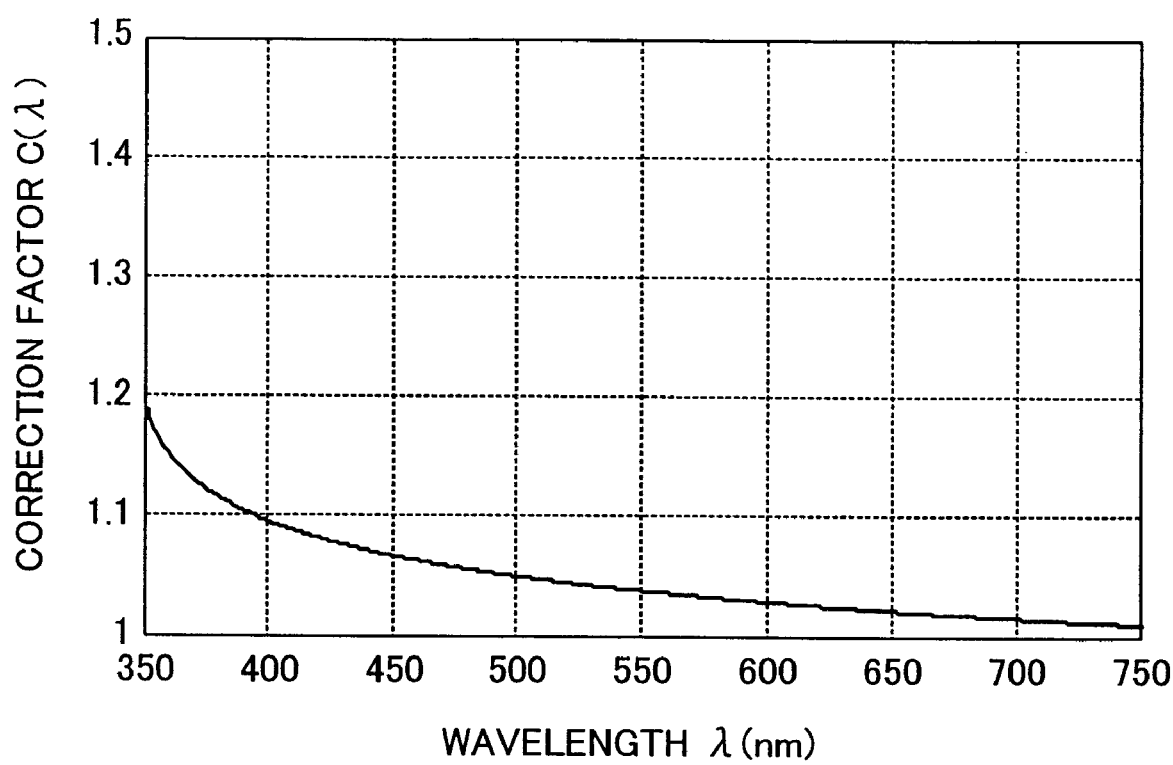
FIG. 6 is a graph showing an example of an approximation function $C(\lambda)$ of a correction factor.

The correction factor estimator 543 estimates a mathematical function for approximating the correction factor with respect to each of the wavelengths in the wavelength range to be measured, based on the correction factor at each of the wavelengths of the monochromatic reference lights obtained by the correction factor calculator 542. FIG. 6 is a graph showing an example of an approximation function $C(\lambda)$ of the correction factor.

The correction factor rewriter 544 obtains a correction factor at each of the wavelength in the wavelength range to be measured based on the approximation function obtained by the correction factor estimator 543, and creates a table showing a correlation between the wavelengths and the respective correction factors reflecting the sensitivity fluctuation. Then, the correction factor rewriter 544 sends data of the table to the spectroradiometer 4 to rewrite the wavelength-correction factor table stored in the correction factor storage 43 into the newly created table.

The ROM 55 stores therein various operation programs, inherent data, and the like. An operation program for the calibration system S is also stored in the ROM 55. The RAM 56 temporarily stores therein spectral radiance measurement data used in calibration, and the like.

<Description on Operation Flow>

In the following, an operation flow of a process for calibrating the spectroradiometer 4 using the calibration source 1 in the first embodiment is described. Briefly describing the flow, monochromatic reference lights originated from the calibration source 1 are measured by the spectroradiometer 4 to be calibrated, and a sensitivity correction factor with respect to the wavelength of each of the monochromatic reference lights is obtained by the control PC 5. Further, the approximation function $C(\lambda)$ of the sensitivity correction factor with respect to each wavelength in the wavelength range to be measured is obtained for storage into the spectroradiometer 4. In this embodiment, a wavelength shift is also detected and calibrated along with the sensitivity calibration. The calibrated spectroradiometer 4 corrects a measured spectral radiance $R(\lambda)$ to a corrected spectral radiance $R'(\lambda)$ by implementing the equation (2) for output.

$$R'(\lambda)=C(\lambda)\cdot R(\lambda) \quad (2)$$

With the calibration source 1 in accordance with this embodiment, the correction factors are obtained only at the wavelengths of the three monochromatic reference lights originated from the semiconductor lasers 21, 22, and 23. However, the embodiment approximates correction factors with respect to all the wavelengths in the wavelength range to be measured, using the approximation function based on the correction factors with respect to the three wavelengths. Generally, dependence of sensitivity fluctuation to wavelength is relatively moderate although it is likely to be increased in a short wavelength range. Accordingly, the correction factors of the respective wavelengths can be approximated by a simple mathematical function as expressed by the equation (3) as shown in FIG. 6 or the like. The constants a, b, and c for determining the approximation function (3) can be estimated based on the correction factors with respect to the three monochromatic reference lights.

$$C(\lambda)=[a\cdot\ln(\lambda+b)+c]^{-1} \quad (3)$$

In the following, a flow for calibrating or re-calibrating the spectroradiometer 4 is described in detail. The calibration source 1 itself must be calibrated before re-calibrating the spectroradiometer 4 using the calibration source 1. Accordingly, a flow for calibrating the calibration source 1, which is generally performed by the manufacturer, is described first, followed by description on a flow for re-calibrating the spectroradiometer 4 using the calibration source 1, which is generally performed by the user. The initial calibration of the spectroradiometer 4 is performed by the manufacturer prior to shipment by a conventional method which is not described here.

<Calibration of Calibration Source 1>

Figure 7:
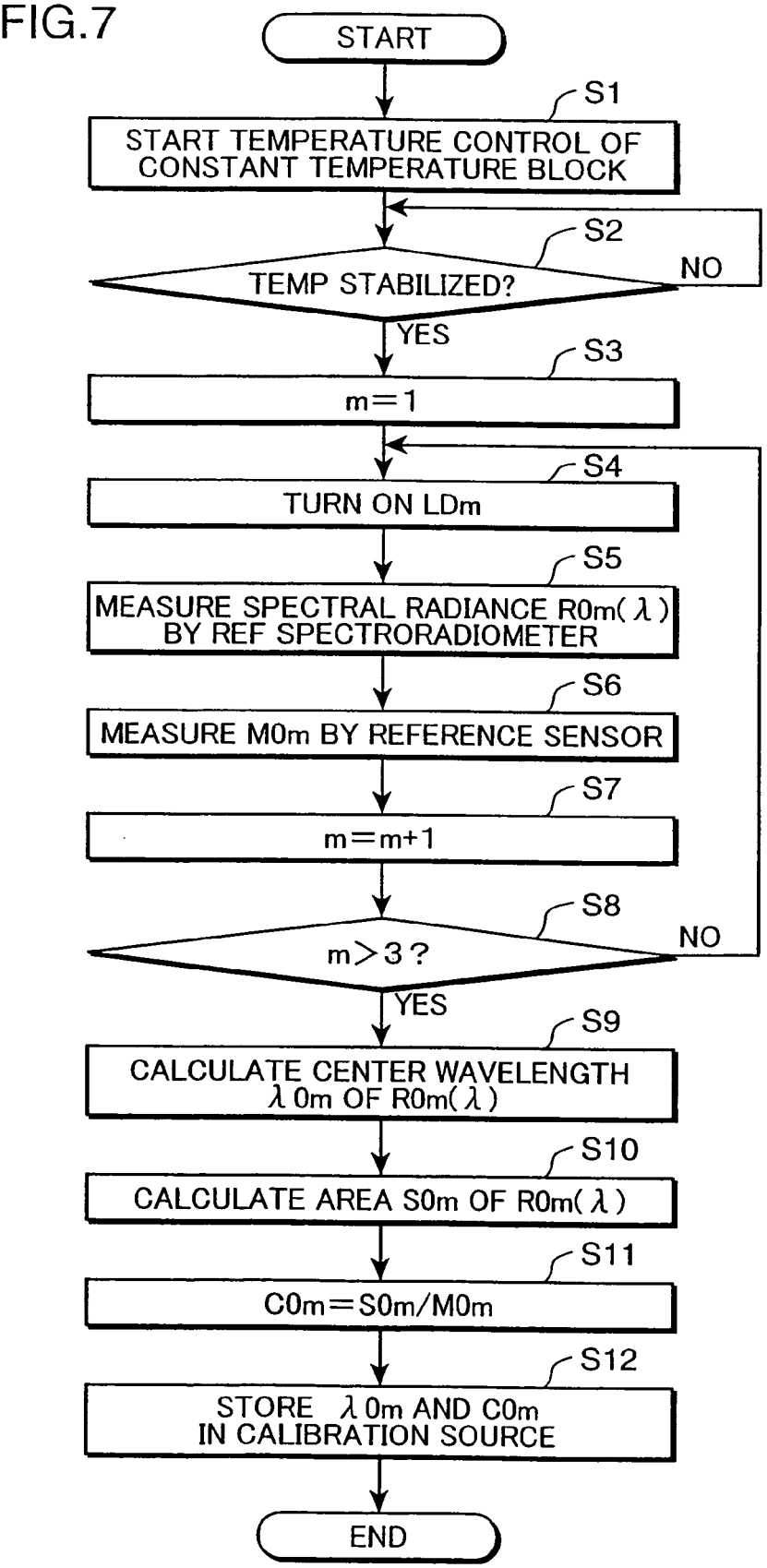
FIG. 7 is a flowchart showing a flow for calibrating the calibration source in the first embodiment.

FIG. 7 is a flowchart showing a flow for calibrating the calibration source 1. The hardware construction for the calibration is substantially the same as that shown in FIG. 1 except that the calibrated reference spectroradiometer 401 is used as a spectroradiometer, and that wavelengths and reference sensitivities with respect to monochromatic reference lights originated from the semiconductor lasers 21, 22, and 23 and emanated from the monochromatic sources are calibrated using the reference spectroradiometer 401. Each reference sensitivity is calibrated by obtaining a ratio of a radiance of monochromatic reference light measured by the reference spectroradiometer 401 to an output from the reference sensor 14.

Referring to the flowchart of FIG. 7 and the block diagram of FIG. 2, in response to a calibration start command from the input device 50, a command is sent from the control PC 5 to the temperature controller 123 of the control/processing unit 12 of the calibration source 1 and in response to the command, the temperature controller 123 starts to control the Pertier thermoelectric device via the constant temperature block controller 13 for keeping the temperature of the constant temperature block 20 at a predetermined constant temperature (Step S1).

Then, the control PC 5 reads an output from the temperature sensor (not shown) mounted on the constant temperature block 20 at a predetermined sampling frequency, and waits until the temperature of the constant temperature block 20 is stabilized to the set temperature±1° C. or less (Step S2). When the temperature of the constant temperature block 20 is stabilized (YES in Step S2), the semiconductor laser $LD_1$ to be turned on at first (m=1, in this embodiment, m=1 to 3) is selected (Step S3), and the selected semiconductor laser $LD_1$ is turned on (Step S4). Specifically, upon receiving a command from the emission controller 51, the source controller 121 sends a command, to the LD driver 31 of the semiconductor laser $LD_1$ to turn on the semiconductor laser $LD_1$. At this time, the shutter 16 is driven to keep the exit aperture 11a of the integrating sphere 11 to a "closed" state.

After the emission state of the semiconductor laser $LD_1$ is stabilized, namely, after it is confirmed that an output $M0_1$ of the reference sensor 14 processed by the reference signal processing circuit 15 is stabilized, the shutter controller 124 controls the shutter driver 17 to open the shutter 16 upon receiving a command from the measurement controller 52. Then, the diffuse light 11b through the exit aperture 11a of the integrating sphere 11 is incident onto an objective optical system of the reference spectroradiometer 401 to measure the spectral radiance of the monochromatic reference light originated from the semiconductor laser $LD_1$. Then, a measured spectral radiance $R0_1(\lambda)$ is temporarily stored in the RAM 55 of the control PC 5 (Step S5).

Concurrently, the reference sensor controller 122 controls the reference signal processing circuit 15 to detect the monitoring light 14b corresponding to the monochromatic reference light of m=1, and the reference data $M0_1$ detected by the reference sensor 14 is temporarily stored in the RAM 55 (Step S6). When these measurement operations are completed, the shutter controller 124 drives the shutter 16 to a "closed" state to prevent dust intrusion.

Thereafter, m is incremented: m=m+1 (Step S7), and the semiconductor laser $LD_2$ i.e. the semiconductor laser 22 to be turned on at second (m=2) is selected. In this embodiment, the three semiconductor lasers having different wavelengths from each other are used, namely, m=1 to 3. Accordingly, if judgment in Step S8 as to m>3 is false (NO in Step S8), the operations from Steps S4 through S6 are executed for the monochromatic reference light of m=2 originated from the semiconductor laser 22, and a spectral radiance $R0_2(\lambda)$ and reference data $M0_2$ are obtained. Similarly, the operations from Steps S4 through S6 are executed for the monochromatic reference light of m=3 originated from the semiconductor laser 23, and a spectral radiance $R0_3(\lambda)$ and reference data $M0_3$ are obtained.

If spectral radiances $R0_m(\lambda)$ and reference data $M0_m$ are obtained after successive turning on of the semiconductor lasers 21, 22, and 23 i.e. the semiconductor lasers $LD_m$ (YES in Step S8), the center wavelength calculator 531 of the control PC 5 calculates reference center wavelength $\lambda 0_m$ for each of the monochromatic reference lights for wavelength calibration (Step S9).

Then, the radiance calculator 541 calculates an area $S0_m$ as defined by the equation (4) using the spectral radiance $R0_m(\lambda)$, for instance, to obtain a radiance corresponding to each of the monochromatic reference lights in order to perform reference sensitivity calibration.

$$S0_m = \int R0_m(\lambda)d\lambda \quad (4)$$

Then, the correction factor calculator 542 calculates a reference sensitivity coefficient $C0_m$ by implementing the equation (5), for instance, based on the area $S0_m$ corresponding to the radiance of the monochromatic reference lights originated from the respective semiconductor lasers $LD_m$, and the reference data $M0_m$ which has been measured simultaneously (Step S11).

$$C0_m = S0_m/M0_m \quad (5)$$

The center wavelengths $\delta 0_m$ (m=1 to 3) obtained in Step S9, and the reference sensitivity coefficients $C0_m$ obtained in Step S11 are stored in the center wavelength-reference sensitivity coefficient storage 125 of the calibration source 1 (Step S12). Thus, the calibration of the calibration source 1 is completed.

<Re-calibration of Spectroradiometer>

Figure 8A:
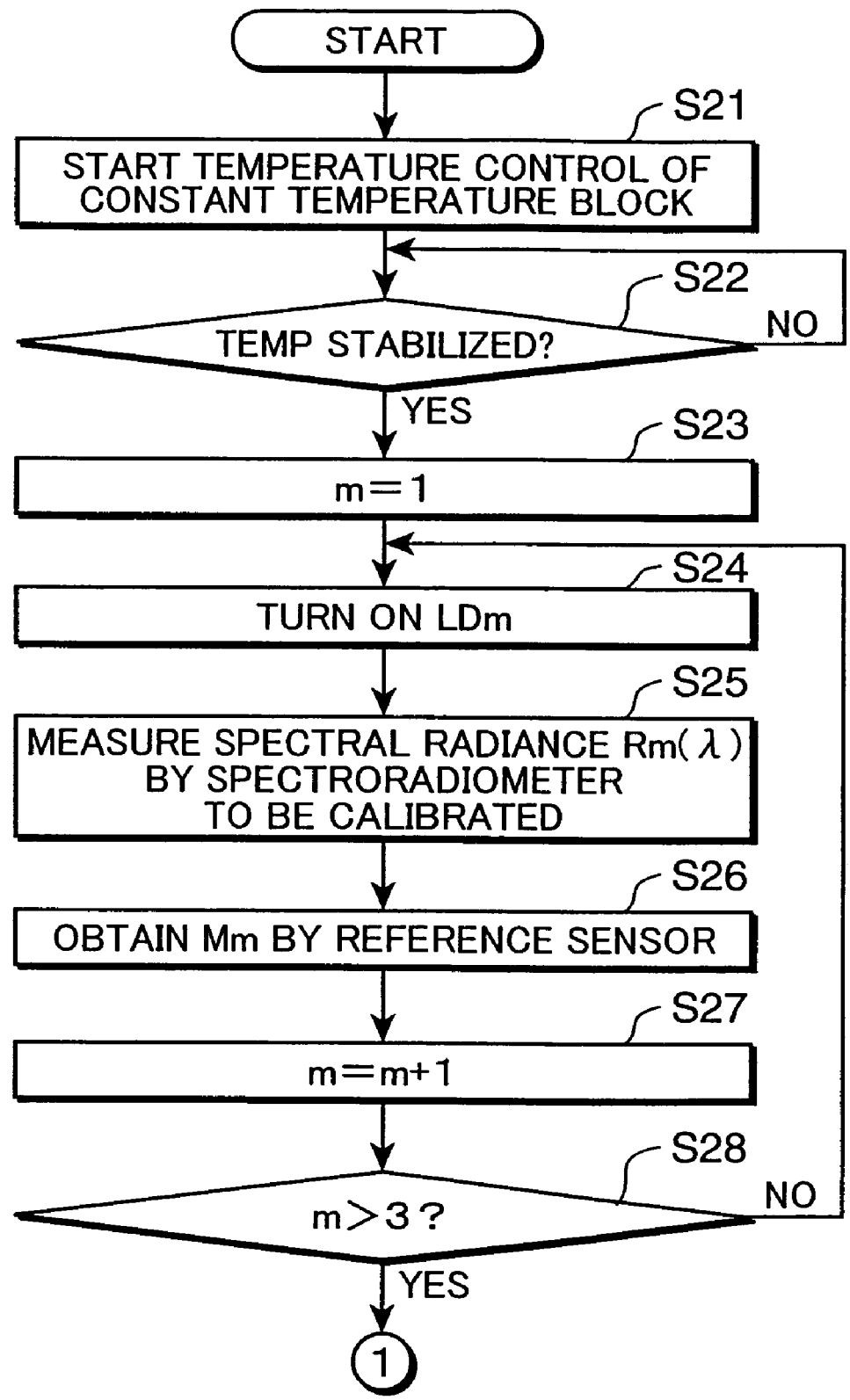
FIGS. 8A and 8B are flowcharts showing a flow for calibrating the spectroradiometer in the first embodiment.
Figure 8B:
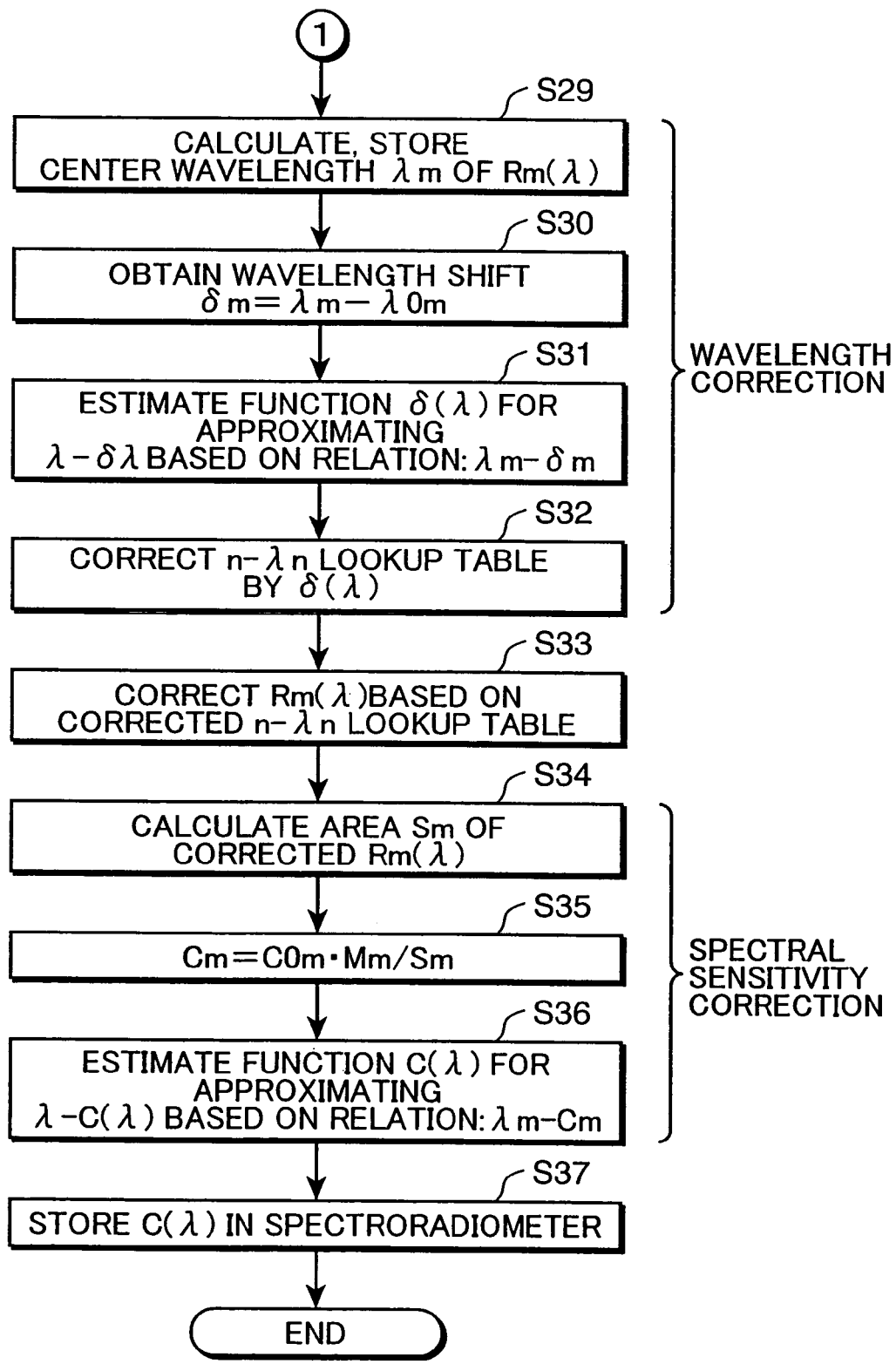

FIGS. 8A and 8B are flowcharts showing an example of a calibration flow of the spectroradiometer 4. Referring to FIGS. 8A and 8B, description is made on a flow for calibrating wavelength shift and spectral sensitivity fluctuation of the spectroradiometer 4, with use of the calibration source 1 whose wavelength and reference sensitivity have been calibrated in the aforementioned processes. The system of the calibration is, as shown in FIG. 1, configured by connecting the calibration source 1 and the spectroradiometer 4 to the control PC 5. The system is so configured that the diffuse light 11b emanated through the exit aperture 11a of the calibration source 1 is received by the objective optical system of the spectroradiometer 4. The center wavelength storage 42 stores therein the table data showing a correlation between the respective pixels and the center wavelengths, which are obtained by the proceeding or initial calibration of the spectroradiometer 4. Similarly, the correction factor storage 43 stores therein the sensitivity correction factor with respect to each of the wavelengths in the wavelength range to be measured obtained by the proceeding or initial calibration.

Referring to the flowchart of FIGS. 8A and 8B and the block diagram of FIG. 2, a spectral radiance is measured in a similar manner as Steps S1 through S8 described referring to FIG. 7. Specifically, in response to a calibration start command from the input device 50, a command is sent from the control PC 5 to the temperature controller 123 of the control/processing unit 12 of the calibration source 1 and, in response to the command, the temperature controller 123 starts to control the Pertier thermoelectric device via the constant temperature block controller 13 for keeping the temperature of the constant temperature block 20 at a predetermined constant temperature (Step S21).

Then, the control PC 5 reads an output from the temperature sensor (not shown) mounted on the constant temperature block 20 at a predetermined sampling frequency, and waits until the temperature of the constant temperature block 20 is stabilized to the set temperature±1° C. or less (Step S22). When the temperature of the constant temperature block 20 is stabilized (YES in Step S22), the semiconductor laser $LD_1$ to be turned on at first (m=1, in this embodiment, m=1 to 3) is selected (Step S23), and the selected semiconductor laser $LD_1$ is turned on (Step S24). Specifically, upon receiving a command from the emission controller 51, the source controller 121 sends a command to the LD driver 31 of the semiconductor laser $LD_1$ to turn on the semiconductor laser $LD_1$. At this time, the shutter 16 is driven to keep the exit aperture 11a of the integrating sphere 11 to a "closed" state.

After the emission state of the semiconductor laser $LD_1$ is stabilized, namely, after it is confirmed that an output $M_1$ of the reference sensor 14 processed by the reference signal processing circuit 15 is stabilized, the shutter controller 124 controls the shutter driver 17 to open the shutter 16 upon receiving a command from the measurement controller 52. Then, the diffuse light 11b through the exit aperture 11a of the integrating sphere 11 is incident onto the objective optical system of the spectroradiometer 4 to be calibrated so that the spectral radiance of the monochromatic reference light originated from the semiconductor laser $LD_1$ is measured. Then, a measured spectral radiance $R_1(\lambda)$ is temporarily stored in the RAM 55 of the control PC 5 (Step S25).

Concurrently, the reference sensor controller 122 controls the reference signal processing circuit 15 to detect the monitoring light 14b corresponding to the monochromatic reference light of m=1, and the reference data $M_1$ detected by the reference sensor 14 is temporarily stored in the RAM 55 (Step S26). When these measurement operations are completed, the shutter controller 124 drives the shutter 16 to a "closed" state to prevent dust intrusion.

Thereafter, m is increment: m=m+1 (Step S27), and the semiconductor laser $LD_2$ i.e. the semiconductor laser 22 to be turned on at second (m=2) is selected. In this embodiment, the three semiconductor lasers having different wavelengths from each other are used, namely, m=1 to 3. Accordingly, as judgment in Step S28 as to m>3 is false (NO in Step S28), the operations from Steps S24 through S26 are executed for the monochromatic reference light of m=2 originated from the semiconductor laser 22, and a spectral radiance $R_2(\lambda)$ and reference data $M_2$ are obtained. Similarly, the operations from Steps S24 through S26 are executed for the monochromatic reference light of m=3 originated from the semiconductor laser 23, and a spectral radiance $R_3(\lambda)$ and reference data $M_3$ are obtained.

If spectral radiances $R_m(\lambda)$ and reference data $M_m$ are obtained after successive turning on of the semiconductor lasers 21, 22, and 23 i.e. the semiconductor laser $LD_m$ (YES in Step S28), the routine proceeds to a step of wavelength correction. In the wavelength correction step, first, the center wavelength calculator 531 of the control PC 5 calculates the center wavelength $\lambda_m$ of each of the monochromatic reference lights based on the spectral radiance $R_m(\lambda)$ (Step S29).

Subsequently, the wavelength shift calculator 532 reads out the center wavelength $\lambda 0_m$ (m=1 to 3) stored in the center wavelength-reference sensitivity coefficient storage 125 of the calibration source 1, and compares the center wavelength $\lambda 0_m$ with a center wavelength $\lambda_m$ (m=1 to 3) actually measured in the aforementioned steps to obtain a wavelength shift. Specifically, a wavelength shift amount $\delta_m$ corresponding to each of the monochromatic reference lights is obtained by comparing the actually measured center wavelength with the center wavelength which is predefined for the calibration source 1 i.e. by implementing the following equation (6) (Step S30).

$$\delta_m = \lambda_m - \lambda 0_m \qquad (6)$$

The approximation function estimator 533 generates a mathematical function approximating the wavelength shift at each of the wavelengths based on a relation between the wavelength shift amount $\delta_m$ and the center wavelength $\lambda_m$, i.e. a relation: $\lambda_m - \delta_m$, and estimates a wavelength shift amount corresponding to the center wavelength of each of the pixels based on the approximation function (Step S31). Specifically, the approximation function estimator 533 obtains an approximation function $\delta(\lambda)$ based on the relation: $\lambda_m - \delta_m$ at each of the wavelengths of the three monochromatic reference lights obtained in Step S30, and estimates a wavelength shift amount with respect to each of the wavelengths in the wavelength range to be measured by the spectroradiometer 4 based on the approximation function. The approximation function obtained in this step may be e.g. a linear function as expressed by the following equation (7) where the constants d and e for determining a function may be estimated based on the relation $\lambda_m - \delta_m$.

$$\delta(\lambda) = d \cdot \lambda + e \qquad (7)$$

Thereafter, the data rewriter 534 creates a corrected table showing a relation between center wavelengths $\lambda_n$ and the respective pixels n reflecting the wavelength shift, based on wavelength shift data $\delta_n$ at the center wavelength of each of the pixels n. The wavelength shift data $\delta_n$ is estimated based on the approximation function $\delta(\lambda)$ obtained by the approximation function estimator 533. The data rewriter 534 sends data of the corrected table to the spectroradiometer 4 and replace the table showing the correlation between the pixels n and the center wavelengths $\lambda_n$ i.e. n–$\lambda_n$ lookup table stored in the center wavelength storage 42 of the spectroradiometer 4 by the new corrected table, in which the center wavelength $\lambda_n$ is corrected, as expressed by the equation (8) (Step S32).

$$\lambda'_n = \lambda_n - \delta(\lambda_n) \qquad (8)$$

As shown by a measurement flow in FIG. 9, the lookup table (hereinafter, called as "corrected n–$\lambda_n$ lookup table") showing the correlation between the respective pixels n and corrected center wavelengths $\lambda'_n$, which is stored in the center wavelength storage 42, is used to convert intensity distributions on the pixels of the sensor array in the spectroradiometer 4 into spectral radiances.

The spectral radiance $R_m(\lambda)$ which has been obtained in Step S25 and temporarily stored in the RAM 55 is corrected based on the corrected n–$\lambda_n$ lookup table reflecting the wavelength shift (Step S33), and the corrected spectral radiance $R_m(\lambda)$ is stored in the RAM 55.

Subsequently, the routine proceeds to steps of spectral sensitivity correction. The radiance calculator 541 calculates an area $S_m$ defined by the equation (9) for instance to obtain a radiance corresponding to each of the monochromatic reference lights using the corrected spectral radiance $R_m(\lambda)$ obtained in Step S33.

$$S_m = \int R_m(\lambda) d\lambda \qquad (9)$$

Next, the correction factor calculator 542 reads out reference sensitivity coefficient $C0_m$ (m=1 to 3) stored in the center wavelength-reference sensitivity coefficient storage 125 of the calibration source 1, and calculates a correction factor $C_m$ by, e.g., implementing the equation (10), based on the area $S_m$ corresponding to the radiances of the monochromatic reference lights originated from the respective semiconductor lasers 21, 22, and 23 or the semiconductor lasers $LD_m$, which has been obtained in Step S34, and on the reference data $M_m$ which has been measured simultaneously (Step S35).

$$C_m = C0_m \cdot M_m / S_m \qquad (10)$$

The correction factor estimator 543 obtains the mathematical function $C(\lambda)$ for approximating the correction factor with respect to each of the wavelengths, based on the relation between the center wavelength $\lambda_m$ and the correction factor $C_m$, namely, the relation: $\lambda_m - C_m$, and estimates a correction factor with respect to each of the wavelengths of the wavelength range to be measured by the spectroradiometer 4 based on the approximation function $C(\lambda)$ using the approximation function (Step S36). The approximation function obtained in this step may be a function as expressed by the equation (3), namely, expressed by the graph of FIG. 6.

Thereafter, the correction factor rewriter 544 sends the approximation function $C(\lambda)$ obtained by the correction factor estimator 543 to the spectroradiometer 4 to store the approximation function $C(\lambda)$ in the correction factor storage 43 of the spectroradiometer 4 (Step S37). Alternatively, a correction factor $C_\lambda$ with respect to each of the wavelengths in the wavelength range to be measured, estimated based on the approximation function $C(\lambda)$, may be stored in the correction factor storage 43. In this way, the wavelength correction and the spectral sensitivity correction of the spectroradiometer 4 are completed.

<Measurement by Calibrated Spectroradiometer>

Figure 9:
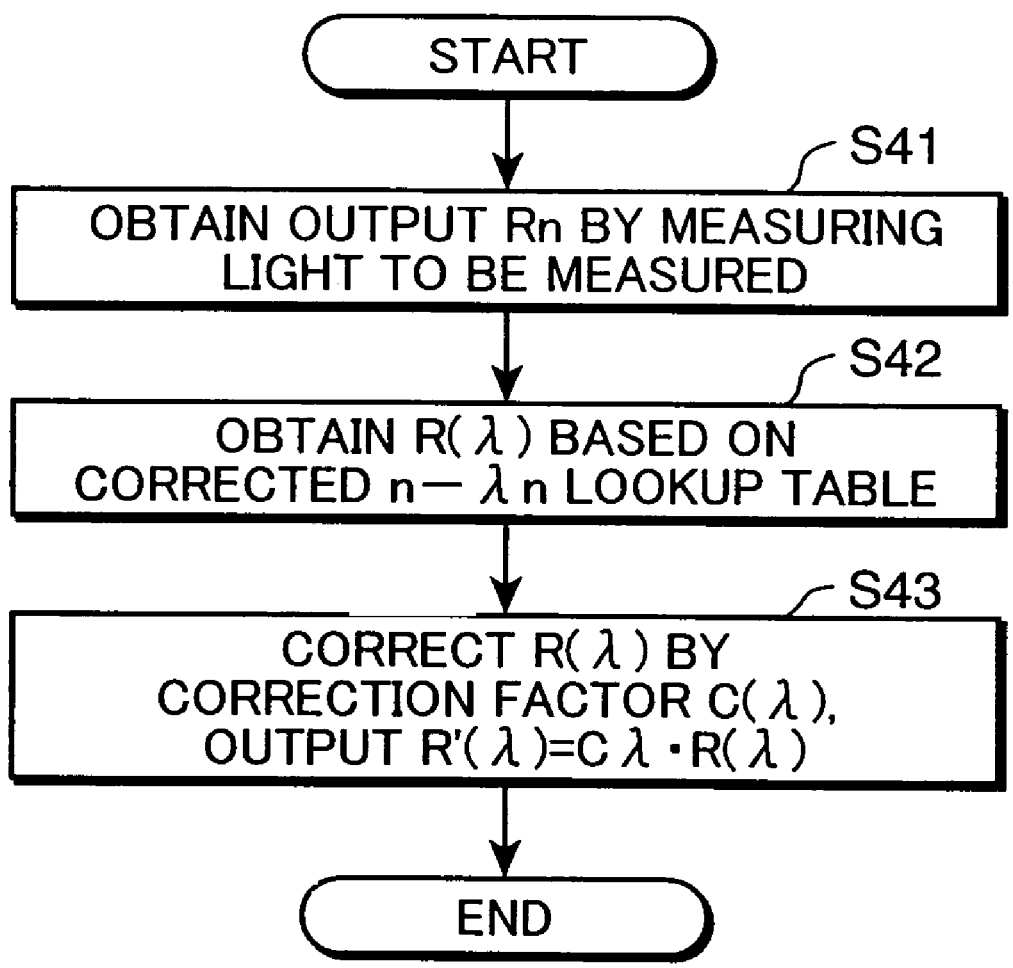
FIG. 9 is a flowchart showing a flow for measuring a light source to be measured by a calibrated or corrected spectroradiometer.

FIG. 9 is a flowchart showing a flow for measuring a light to be measured by the calibrated or the corrected spectroradiometer 4. In the measurement, a spectral radiance $R(\lambda)$ is obtained using the corrected n–$\lambda_n$ lookup table stored in the center wavelength storage 42, and the spectral radiance $R(\lambda)$ is converted into a corrected spectral radiance $R'(\lambda)$ by implementing the equation (2) using the correction factor $C_\lambda$ or the approximation function $C(\lambda)$ stored in the correction factor storage 43 for output.

Specifically, according to the measurement flow, a light source to be measured to be incident onto the objective optical system of the spectroradiometer 4 and the output $R_n$ with respect to each of the pixels is obtained (Step S41). Then, the output $R_n$ with respect to each of the pixels is converted into the spectral radiance $R(\lambda)$, using the corrected n–$\lambda_n$ lookup table stored in the center wavelength storage 42 (Step S42). Thereafter, the spectral radiance $R(\lambda)$ is converted into the corrected spectral radiance $R'(\lambda) = C(\lambda) \cdot R(\lambda)$ by implementing the equation (2) using the approximation function or the correction factor $C_\lambda$ stored in the correction factor storage 43 for output (Step S43). Thus, the corrected spectral radiance $R'(\lambda)$ is obtained, wherein the wavelength shift and the spectral sensitivity shift have been corrected.

Second Embodiment

Figure 10:
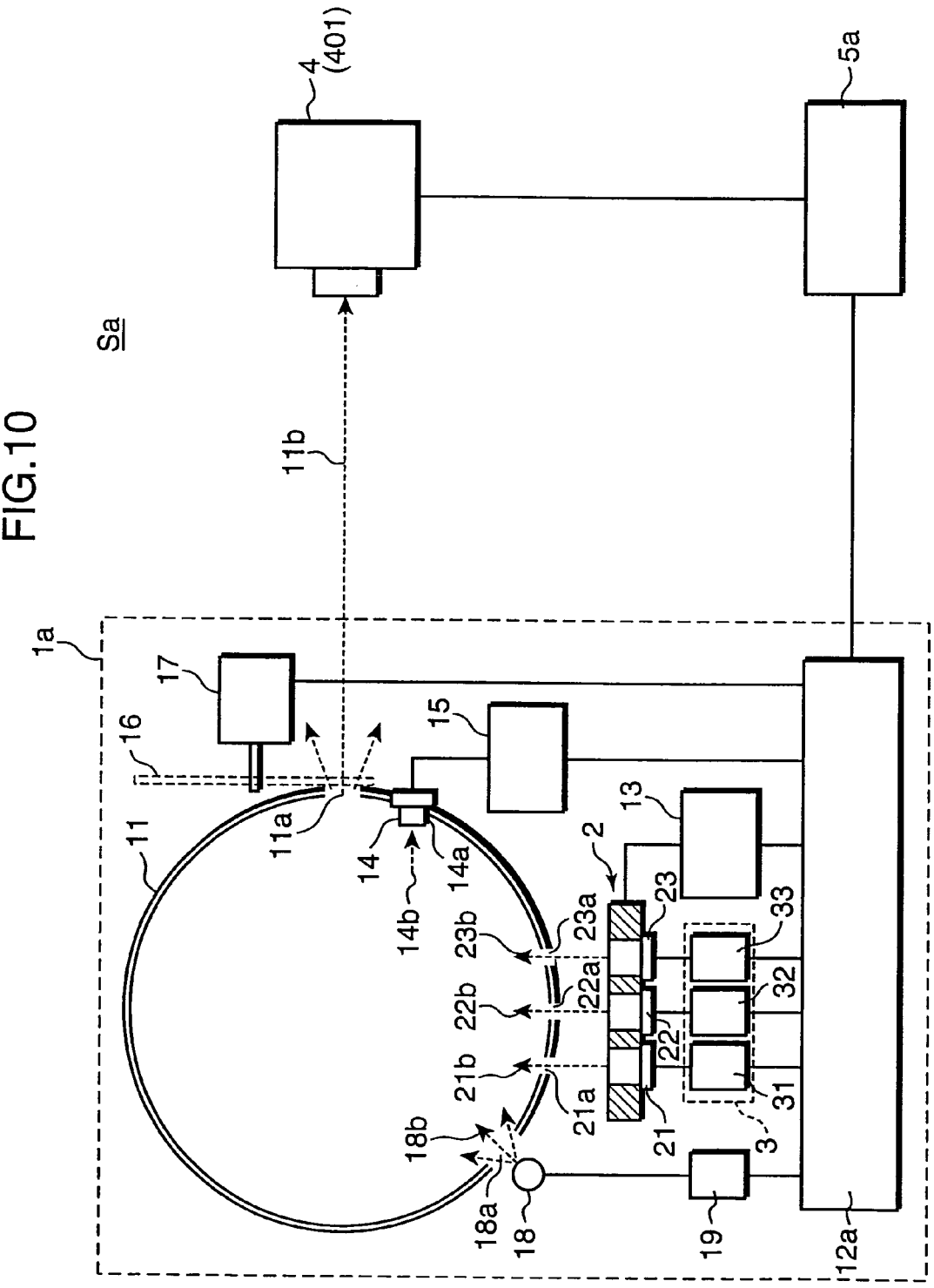
FIG. 10 is a system block diagram showing a construction of a calibration system using a calibration source for calibrating a spectroradiometer in accordance with a second embodiment of the invention.
Figure 11:
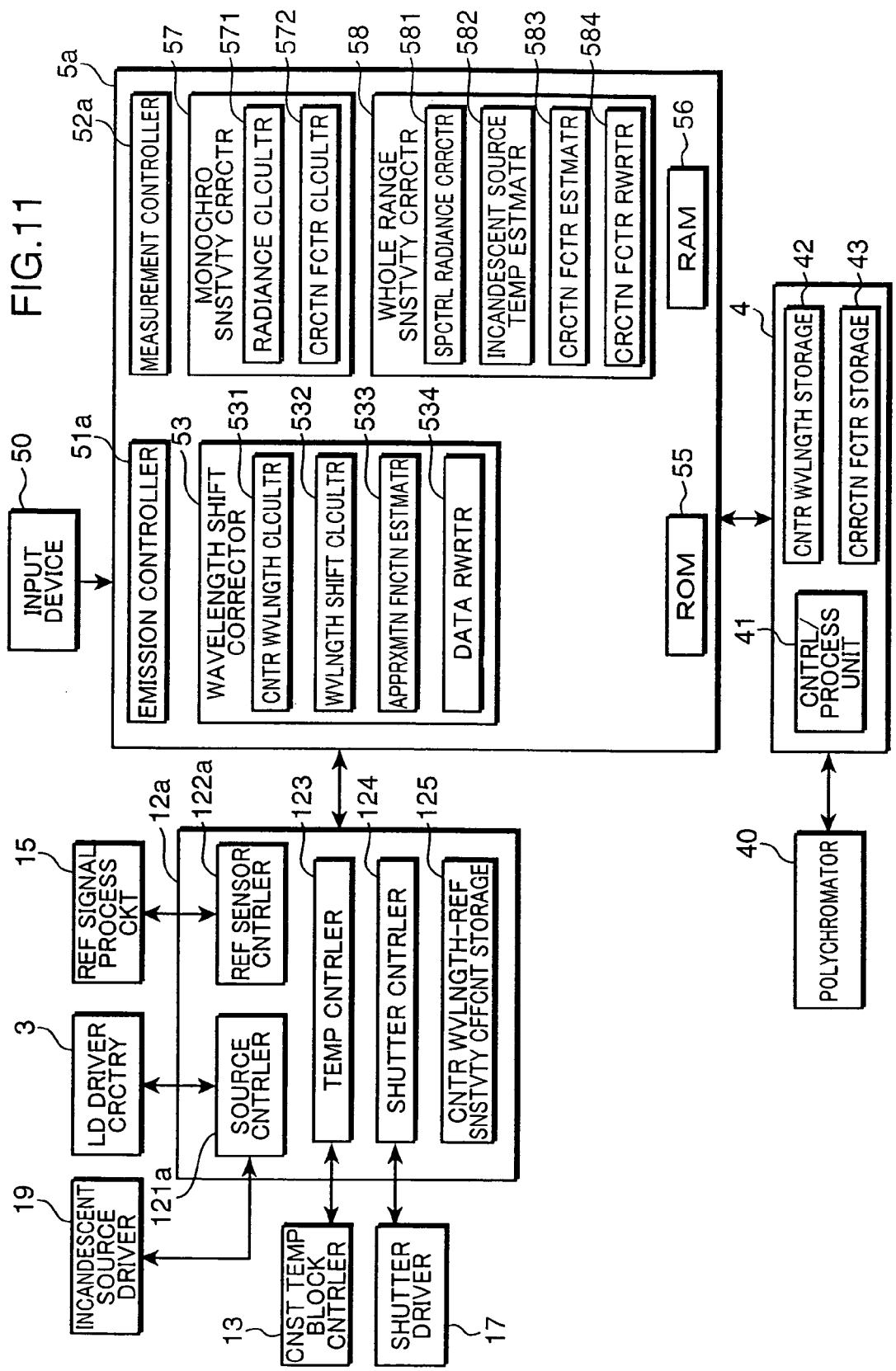
FIG. 11 is a functional block diagram showing a functional arrangement of the calibration system in the second embodiment.

FIG. 10 is a system block diagram showing an arrangement of a calibration system Sa using a calibration source 1a of a spectroradiometer in accordance with a second embodiment of the invention. FIG. 11 is a functional block diagram showing a functional arrangement of the calibration system Sa. The calibration system Sa includes the calibration source 1a, a spectroradiometer 4 to be calibrated, and a control personal computer (PC) 5a. The basic arrangement of the second embodiment is substantially the same as that of the first embodiment, and elements in the second embodiment having the same reference numerals as in FIGS. 1 and 2 are the same elements or functional parts as in the first embodiment. In the following, description on the elements identical or equivalent to those in the first embodiment is omitted or simplified, and features of the second embodiment different from the first embodiment are primarily described.

As shown in FIG. 10, the second embodiment is substantially different from the first embodiment in the aspect of hardware construction in that an incandescent source 18 for emitting incandescent reference light, and an incandescent source driver 19 for driving the incandescent source 18 are additionally provided to the calibration source 1a. In view of this, an integrating sphere 11 has first incident apertures 21a, 22a, 23a through which monochromatic reference lights from a laser unit 2 are incident, and a second incident aperture 18a through which incandescent light emitted from the incandescent source 18 is incident.

The incandescent source 18 originated incandescent reference light of a continuous spectrum, not of a line spectrum, and the relative spectral radiance of which can be estimated by knowing its color temperature. Also, the incandescent source driver 19 generates a drive signal for turning on the incandescent source 18 in response to a control signal from a control/processing unit 12a. The first embodiment estimates correction factor, with respect to all the wavelengths in the wavelength range to be measured, are estimated using the approximation function $C(\lambda)$ based on the correction factor obtained with respect to each of the wavelengths of the three monochromatic reference lights. In the second embodiment, correction factors with respect to all wavelengths in the wavelength range to be measured are estimated based on the continuous spectrum of incandescent reference light originated from the incandescent source 18.

The second embodiment is substantially different from the first embodiment in the aspect of functional arrangement in that the control/processing unit 12a of the calibration source 1a includes a source controller 121a having a different function from the corresponding one in the first embodiment, and a reference sensor controller 122a. The source controller 121a not only generates a control signal to be outputted to an LD driver circuitry 3 so as to successively turn on semiconductor lasers 21, 22, and 23, but also generates a control signal to be outputted to the incandescent source driver 19 so as to turn on the incandescent source 18 in accordance with a predetermined measurement sequence supplied from the control PC 5a.

The reference sensor controller 122a not only acquires reference data of radiances of the monochromatic reference lights originated from the semiconductor lasers 21, 22, and 23, but also acquires reference data of a radiance of the incandescent reference light sent from a reference signal processing circuit 15 which receives the reference signal indicative of the radiance of the incandescent reference light from a reference sensor 14 during the emission of the incandescent source 18.

The control PC 5a in the second embodiment is different from the control PC 5 in the first embodiment in that an emission controller 51a and a measurement controller 52a having different functions from the corresponding ones in the first embodiment are provided as functional parts for spectral sensitivity correction, and in that a monochromatic sensitivity corrector 57 and a whole range sensitivity corrector 58 are provided in place of the sensitivity corrector 54 shown in FIG. 2.

The emission controller 51a outputs a command to the source controller 121a of the control/processing unit 12a in accordance with the predetermined measurement sequence, and functions as a command section for controlling emission of the semiconductor lasers 21, 22, and 23, and emission of the incandescent source 18.

The measurement controller 52a outputs a command to the reference sensor controller 122a of the control/processing unit 12a in accordance with the predetermined measurement sequence, and functions as a command section for controlling measurement of reference intensity of the monochromatic reference light and the incandescent reference light by the reference sensor 14. Also, the measurement controller 52a outputs a command for causing a control/processing unit 41 of the spectroradiometer 4 to measure spectral radiances of the monochromatic reference light and the incandescent reference light. Further, the measurement controller 52a outputs a command for temporarily storing the spectral radiance measured by the spectroradiometer 4 into an RAM 56, and outputs commands relating to measurement necessary for wavelength correction and spectral sensitivity correction to the respective components.

The monochromatic sensitivity corrector 57 is a functional part for performing spectral sensitivity correction at each of the wavelengths of the monochromatic reference lights originated from the respective semiconductor lasers 21, 22, and 23, based on the monochromatic reference lights, and includes a radiance calculator 571 and a correction factor calculator 572.

The radiance calculator 571 calculates radiances of the monochromatic reference lights originated from the respective semiconductor lasers 21, 22, and 23 based on the spectral radiance of the monochromatic reference lights measured by the spectroradiometer 4. The radiances may be obtained by calculating an area $S_m$ of a profile of a spectral radiance $R_m(\lambda)$ as shown in FIG. 4B, for instance.

The correction factor calculator 572 obtains a sensitivity variation at each of the monochromatic reference lights by comparing the radiance with respect to each of the monochromatic reference lights obtained by the radiance calculator 571 with a reference radiance obtained by multiplying the reference data obtained by the detection of the same monochromatic reference light by the reference sensor 14 by a reference sensitivity coefficient read out from a center wavelength-reference sensitivity coefficient storage 125 of the calibration source 1a, and calculates a correction factor for correcting the sensitivity variation.

The whole range sensitivity corrector 58 is a functional part for performing spectral sensitivity correction at all wavelengths in the wavelength range to be measured, based on the incandescent reference light originated from the incandescent source 18, and includes a spectral radiance corrector 581, an incandescent source temperature estimator 582, a correction factor estimator 583, and a correction factor rewriter 584.

The spectral radiance corrector 581 obtains the spectral radiance data measured when the incandescent source 18 of the calibration source 1a is turned on, and the incandescent reference light is incident onto the spectroradiometer 4 to be calibrated, and corrects the spectral radiance data at each of the wavelengths of the monochromatic reference lights, using a correction factor, which is newly obtained with respect to each of the monochromatic reference lights by the correction factor calculator 572. In other words, a corrected spectral radiance of incandescent reference light is obtained at each of the wavelengths of the three monochromatic reference lights to estimate the color temperature and the radiance intensity of the incandescent reference light.

The incandescent source temperature estimator 582 estimates a color temperature and a radiance intensity of the incandescent source 18 based on the corrected spectral radiance at each of the wavelengths of the three monochromatic reference lights obtained by the spectral radiance corrector 581. Estimation of the color temperature of the incandescent reference light allows to estimate the relative spectral radiance thereof based on the aforementioned Plank's equation expressed by the equation (1), and estimation of the radiance intensity thereof allows to estimate the absolute spectral radiance.

The correction factor estimator 583 obtains or estimates a reference spectral radiance of the incandescent reference light based on the color temperature and the radiant intensity thereof, which have been estimated by the incandescent source temperature estimator 582. The correction factor estimator 583 obtains a new correction factor with respect to each of the wavelengths in the wavelength range to be measured, based on the relation between the obtained reference spectral radiance and the spectral radiance actually measured by the spectroradiometer.

Then, the correction factor rewriter 584 rewrites the correction factor stored in a correction factor storage 43 of the spectroradiometer 4 into the newly obtained correction factors.

Figure 12:
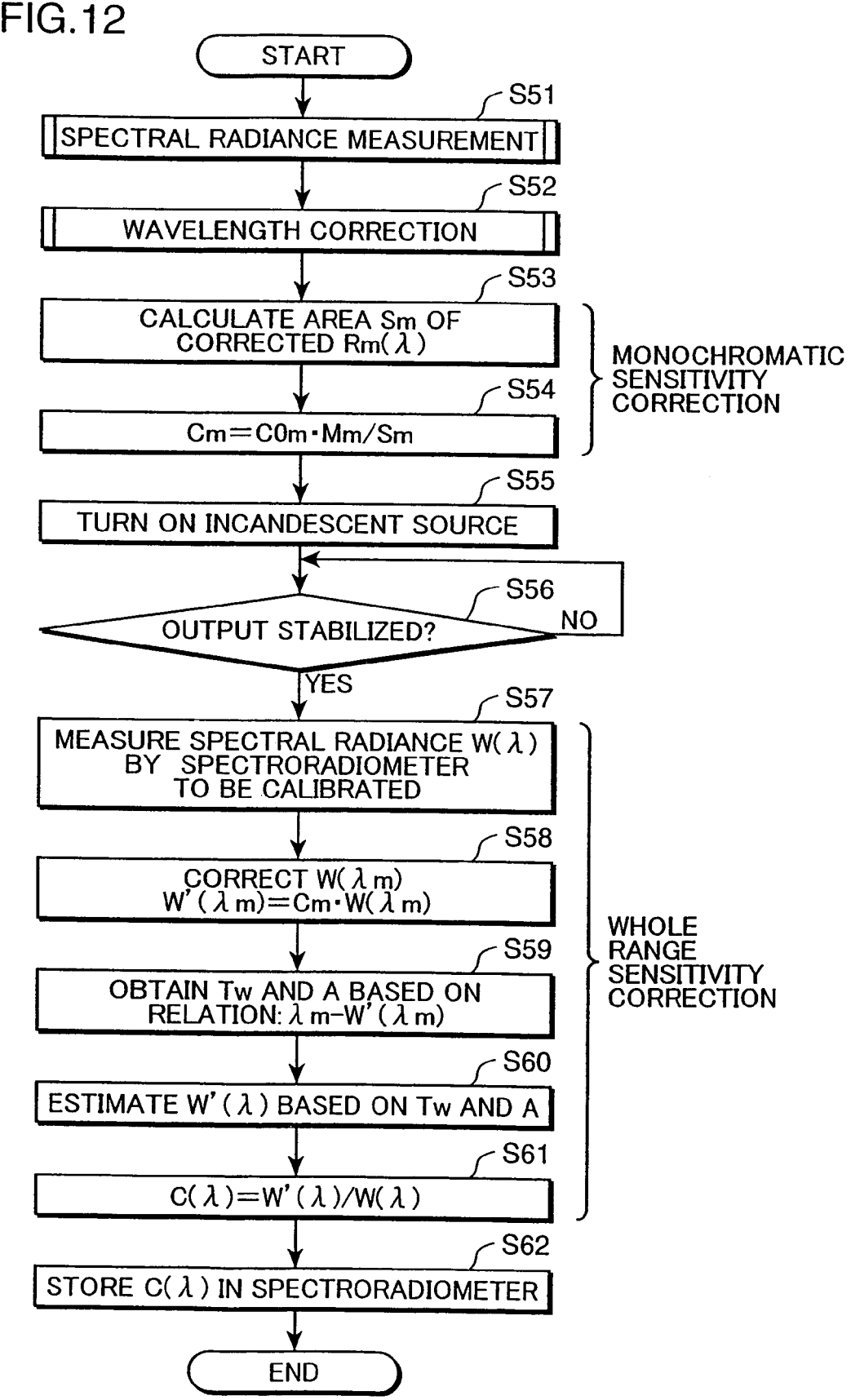
FIG. 12 is a flowchart showing a flow for calibrating the spectroradiometer in the second embodiment.

An operation flow for calibrating the spectroradiometer 4 by the calibration system Sa having the above arrangement is described referring to FIG. 12. FIG. 12 is a flowchart showing an example of a calibration flow of the spectroradiometer 4. First, the semiconductor lasers 21, 22, and 23, namely, the semiconductor lasers $LD_m$ (m=1 to 3) are successively turned on, and spectral radiance $R_m(\lambda)$ with respect to each of the monochromatic reference lights originated from the semiconductor lasers $LD_m$ is measured (Step S51). Since the details on the flow of the spectral radiance measurement are substantially the same as the operations from Steps S21 through S28 shown in FIG. 8A, description thereof is omitted herein. Subsequently, wavelength correction is performed according to a technique of calculating a center wavelength $\lambda_m$ based on the spectral radiance $R_m(\lambda)$ (Step S52). The details on the flow of the wavelength correction are substantially the same as the operations in Steps S29 through S33 shown in FIG. 8B.

Subsequently, the routine proceeds to a step of monochromatic sensitivity correction. Specifically, the radiance calculator 571 calculates the area $S_m$ defined by the equation (9) to obtain a radiance corresponding to each of the monochromatic reference lights using the spectral radiance $R_m(\lambda)$, which has been corrected in Step S52 (Step S53).

Then, the correction factor calculator 572 reads out a reference sensitivity coefficient $C0_m$ (m=1 to 3) stored in the center wavelength-reference sensitivity coefficient storage 125 of the calibration source 1a, and calculates a correction factor $C_m$ by implementing the equation (10) based on the area $S_m$ corresponding to the radiance of each of the monochromatic reference lights originated from the respective semiconductor lasers $LD_m$, which has been calculated in Step S53, and a reference sensor output $M_m$, which has been simultaneously measured (Step S54).

Thereafter, the source controller 121a sends a drive signal to the incandescent source driver 19 in response to a command from the emission controller 51a to turn on the incandescent source 18 (Step S55). Then, a waiting time is provided until the stabilized emission of the incandescent source 18 is confirmed through the output from the reference sensor 14 (Step S56).

Subsequently, the routine goes to a step of whole range sensitivity correction. First, a shutter controller 124 drives a shutter driver 17 upon receiving a command from the measurement controller 52a to open a shutter 16. Then, diffuse light 11b through an exit aperture 11a of the integrating sphere 11 is incident onto an objective optical system of the spectroradiometer 4 to be calibrated to measure a spectral radiance $W(\lambda)$ of the incandescent reference light originated from the incandescent source 18. The spectral radiance $W(\lambda)$ is temporarily stored in an RAM 55 of the control PC (Step S57). Upon completion of the measurement, the shutter controller 124 closes the shutter 16 to prevent dust intrusion.

The spectral radiance corrector 581 corrects the spectral radiance $W(\lambda)$ measured when the incandescent reference light is incident onto the spectroradiometer 4 at each of the wavelengths of the monochromatic reference lights, using the correction factor $C_m$, which has been newly obtained with respect to each of the monochromatic reference lights by the correction factor calculator 572 in Step S54 (Step S58). In other words, the spectral radiance $W(\lambda_m)$ at the wavelength $\lambda_m$ of the monochromatic reference light is corrected to the corrected spectral radiance $W'(\lambda_m)$ using the correction factor $C_m$ by implementing the equation (11).

$$W'(\lambda_m) = C_m \cdot W(\lambda_m) \tag{11}$$

Then, the incandescent source temperature estimator 582 estimates a temperature $T_w$ and a radiance intensity A of the incandescent reference light based on the corrected spectral radiance $W'(\lambda_m)$ at each of the wavelengths of the three monochromatic reference lights obtained by the spectral radiance corrector 581 and the Planks' equation (12) (Step S59).

$$W(\lambda) = A \cdot C_1 \cdot \lambda^{-5} \exp[1 - C_2/(\lambda \cdot T_w)] \tag{12}$$

Specifically, the correction factor estimator 583 calculates the estimated spectral radiance $W'(\lambda)$ of the incandescent reference light at all wavelengths in the wavelength range to be measured by implementing the equation (12) based on the temperature $T_w$ and the radiant intensity A of the incandescent reference light, which have been estimated by the incandescent source temperature estimator 582 (Step S60).

Then, a correction factor $C(\lambda)$ with respect to each of the wavelengths is obtained by implementing the equation (13) based on the estimated spectral radiance $W'(\lambda)$ obtained for all wavelengths in the wavelength range to be measured, and the spectral radiance $W(\lambda)$ actually measured by the spectroradiometer 4 (Step S61).

$$C(\lambda) = W'(\lambda)/W(\lambda) \tag{13}$$

Thereafter, the correction factor rewriter 584 rewrites the data stored in the correction factor storage 43 of the spectroradiometer 4 into data of the newly obtained correction factor $C(\lambda)$ (Step S62). Thus, the wavelength correction and the spectral sensitivity correction of the spectroradiometer 4 are completed. A flow for measuring the light to be measured by the calibrated spectroradiometer 4 is substantially the same as that in the first embodiment. For instance, the measurement can be conducted according to the flow shown in FIG. 9.

Third Embodiment

Figure 13:
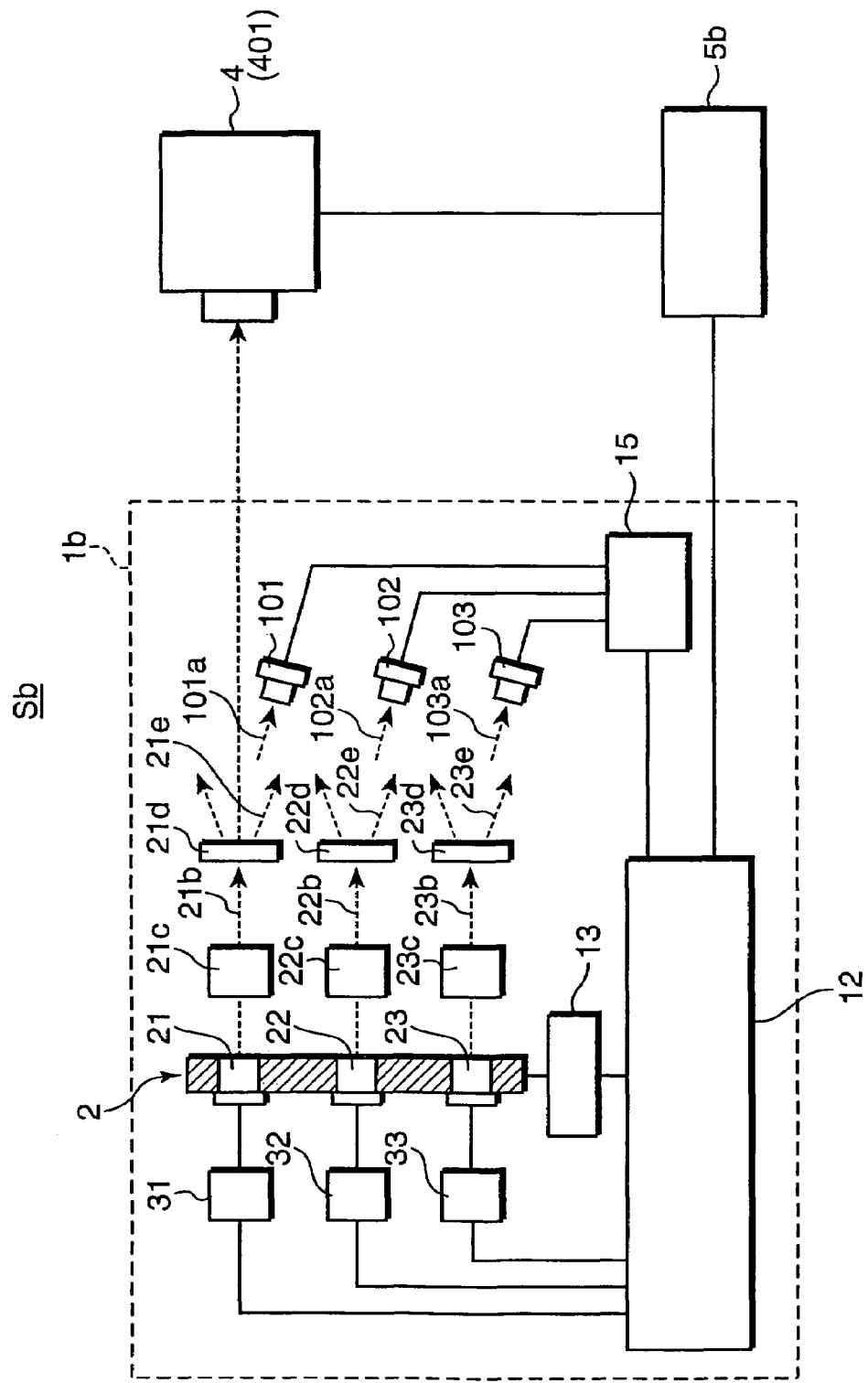
FIG. 13 is a system block diagram showing an arrangement of a calibration system using a calibration source for calibrating a spectroradiometer in accordance with a third embodiment of the invention.

FIG. 13 is a system block diagram showing an arrangement of a calibration system Sb of a spectroradiometer using a calibration source 1b in accordance with a third embodiment of the invention. The calibration system Sb includes the calibration source 1*b*, the spectroradiometer 4 to be calibrated, and a control personal computer (PC) 5*b*. The basic arrangement of the third embodiment is substantially the same as that of the first embodiment, and elements in the third embodiment having the same reference numerals as in FIG. 1 are the same elements or functional parts as in the first embodiment. In the following, description on the elements identical or equivalent to those in the first embodiment is omitted or simplified, and features of the third embodiment different from the first embodiment are primarily described.

The third embodiment is different from the first embodiment in that diffusers 21*d*, 22*d*, and 23*d* constitute individual calibration sources for monochromatic reference lights, in place of an integrating sphere. Specifically, as shown in FIG. 13, monochromatic rays 21*b*, 22*b*, and 23*b* emitted from semiconductor lasers 21, 22, and 23 in a laser unit 2 of the calibration source 1*b* have their beam diameters expanded by beam expanders 21*c*, 22*c*, and 23*c* so that the expanded rays are incident onto the diffusers 21*d*, 22*d*, and 23*d*, respectively. The monochromatic lights 21*b*, 22*b* and 23*b* incident onto the diffusers 21*d*, 22*d*, and 23*d* are diffused as monochromatic reference lights 21*e*, 22*e*, and 23*e*, respectively. Parts 101*a*, 102*a*, and 103*a* of the monochromatic reference lights 21*e*, 22*e*, and 23*e* are received by reference sensors 101, 102, and 103 as monitoring lights, respectively, and signals indicative of the reference intensity thereof are sent to a reference signal processing circuit 15.

A flow on calibrating the calibration source 1*b*, and a flow on calibrating the spectroradiometer 4 using the calibration source 1*b* are substantially the same as those in the first embodiment except that a reference spectroradiometer 401 or the spectroradiometer 4 to be calibrated is located at such a position that the monochromatic reference lights 21*e*, 22*e*, and 23*e* emitted from the diffusers 21*d*, 22*d*, and 23*d* are successively incident onto an objective optical system of the reference spectroradiometer 401 or of the spectroradiometer 4 to be calibrated.

In the third embodiment, the additional use of incandescent reference light as described in the second embodiment can be realized by additionally providing an incandescent source, and a diffuser for diffusing incandescent light emitted from the incandescent source so that the diffused incandescent light is emitted as incandescent reference light. A flow for calibrating the spectroradiometer in this case is substantially the same as the calibration flow described in the second embodiment.

The first through the third embodiments have been described as mentioned above. The invention is not limited to the above, and various modifications can be applied to the invention. For instance, in the foregoing embodiments, described is the case that three semiconductor lasers having output wavelengths of 408 nm, 473 nm, and 650 nm are used as monochromatic sources for emitting three different monochromatic reference lights. Alternatively, it is possible to additionally use a green laser emitting light of e.g. 532 nm to cover a relatively wide vacancy between the output wavelengths of 473 nm and 650 nm. The altered arrangement enables to raise precision in function approximation of the correction factor for all wavelengths in the wavelength range to be measured.

Also, it is possible to provide the calibration method to be implemented by the calibration system S, Sa, or Sb i.e. the calibration method to be implemented by the control PC 5 or the control PC5*a* in the form of a program. The program can be provided by means of a program product by recording the program in a computer-readable recording medium such as a flexible disk, a CD-ROM, an ROM, an RAM, or a memory card. Alternatively, the program can be provided by recording the program in a recording medium such as a hard disk in the control PC 5 or the control PC 5*a*. Further alternatively, the program can be provided by downloading via a network. Further, it is possible to perform procedures for wavelength correction and spectral sensitivity correction, shown in the flowchart in FIG. 9, in PC connected to a recalibrated or corrected spectroradiometer, not in the spectroradiometer as in the above described embodiments. This enables conventional sectroradiometers without functions for corrections of aforementioned embodiments in the market to have benefits of aforementioned embodiments although spectroradiometer must be connected to the PC containing functions and data for the corrections.

As described above, a calibration source for calibrating a spectroradiometer is provided with: a plurality of monochromatic sources for emitting monochromatic light having different wavelengths from each other, respectively; a reference light emitter for emitting monochromatic reference light by receiving the monochromatic light emitted from the monochromatic sources; a sensor for measuring a reference intensity of the monochromatic reference light emitted from the reference light emitter; and a controller for controlling the emission of the monochromatic rays by the monochromatic sources, and the measurement of the reference intensity of the monochromatic reference light by the sensor.

Generally, fluctuation of a relative spectral radiance and fluctuation of a radiant intensity are primary fluctuation factors of a calibration source. The calibration source has the reference light emitter for emitting monochromatic reference light. The plural monochromatic sources are used, in place of a light source having a continuous spectral radiance. This arrangement is inherently free from fluctuation of a relative spectral radiance, in other words, wavelength stability is secured, thereby eliminating fluctuation of a relative spectral intensity. Also, even if fluctuation of a radiant intensity has occurred, the fluctuation can be easily and securely monitored by the sensor.

Specifically, since the light to be monitored is the monochromatic reference light, this arrangement does not require a filter for providing a spectral sensitivity necessary for monitoring incandescent reference light. Fluctuation of a radiant intensity can be monitored by a photo detector having a stable spectral sensitivity such as a silicon photodiode, as the reference sensor. Measuring the monochromatic reference light, which is free from wavelength fluctuation and whose radiant intensity is accurately and stably monitored by the reference sensor, by the spectroradiometer to be calibrated, enables to measure sensitivity fluctuation at the wavelength of the monochromatic reference light with high precision. Also, the sensitivity fluctuation at each of the wavelengths in a wavelength range to be measured by the spectroradiometer can be estimated and corrected based on the sensitivity fluctuation at the wavelength of the monochromatic reference light.

According to the above arrangement, the user can easily re-calibrate the spectroradiometer if the user has the calibration source. An example of the monochromatic source includes a semiconductor laser. The calibration source uses the monochromatic sources. As compared with an incandescent reference source as used in a conventional sensitivity calibration, the above arrangement makes it easy to establish a calibration environment and control the light source. This arrangement is advantageous in saving time and cost in the case where sensitivity re-calibration of the spectroradiometer is required, because there is no need of returning the spectroradiometer to a manufacturing factory, a servicing facility or the like site. Also, the time saving and cost saving arrangement makes it possible to re-calibrate the sensitivity of the spectroradiometer with sufficient frequency, which contributes to maintaining the measurement precision of the spectroradiometer.

The reference light emitter may be preferably provided with an integrating sphere having incident apertures for allowing the monochromatic rays to enter, respectively, and an exit aperture for allowing the monochromatic reference light to exit by iterative reflection of the incident monochromatic light. In this case, the reference sensor measures intensities of the monochromatic light iteratively reflected by the integrating sphere.

In the above arrangement, a plurality of the monochromatic reference lights can be successively emitted through the single exit aperture by allowing the monochromatic light having the different wavelengths from each other to be emitted successively from the respective monochromatic sources into the integrating sphere through the incident apertures. This arrangement enables the spectroradiometer to securely focus into the exit aperture, and to calibrate the spectroradiometer in a stable manner. Also, since reference light close to the monochromatic reference light can be monitored by the single reference sensor, sensitivity fluctuation can be measured with high precision.

It may be preferable that at least one of the monochromatic sources is a semiconductor laser, and the calibration source includes a temperature controller for controlling a temperature of the semiconductor laser.

In the above arrangement, the temperature of the semiconductor laser can be controlled within a necessary range, which allows sufficient wavelength stability to a compact and inexpensive semiconductor laser having a slight temperature dependence on output wavelength, as the monochromatic source. An example of the semiconductor laser includes a visible-range semiconductor laser of GaN, InGaN, or InGaP. Also, it is possible to use a Pertier thermoelectric device, as the temperature controller.

According to the above arrangement, since the semiconductor laser is used as the monochromatic source, the calibration source can be made compact with a reduced production cost. Also, since the semiconductor laser is equipped with the temperature controller, there is no drawback resulting from temperature dependence of output wavelength thereof.

The reference sensor includes a single semiconductor photo detector, and the photo detector may be preferably provided with a photosensitive surface for directly receiving the monitoring light of the monochromatic reference light without intervening of a filter.

The light to be monitored by the reference sensor is the monochromatic reference light. Unlike a conventional calibration source incorporated with an incandescent source, this arrangement eliminates monitoring the light by plural sensors, wherein each of the sensors has an intended spectral sensitivity by attachment of a filter, which is likely to cause aging or thermal variation in the spectral characteristics. Provided is an arrangement, in which monitoring light of the monochromatic reference light is directly received on the photosensitive surface of the single semiconductor photo detector, i.e., an arrangement, in which the reference intensity of the monochromatic reference light is monitored by a single bare photo detector having a stable spectral sensitivity. Thereby, sensitivity fluctuation at the wavelength of the monochromatic reference light can be measured with high precision. An example of the semiconductor photo detector includes a silicon photodiode.

According to the above arrangement, since the spectral radiance of the monochromatic reference light can be monitored by the single bare photo detector having a stable spectral sensitivity, sensitivity fluctuation at the wavelength of the monochromatic reference light can be measured with high precision, which enables to accurately calibrate the spectroradiometer.

Preferably, the calibration source may be further provided with an incandescent source for emitting incandescent light. In this case, the reference light emitter emits incandescent reference light by receiving the incandescent light emitted from the incandescent source.

In the above arrangement, since the incandescent source is additionally provided, it is possible to measure the incandescent reference light originated from the incandescent source by the spectroradiometer whose sensitivity has been calibrated at the wavelengths of the monochromatic reference lights emitted from the plural monochromatic sources, and to estimate the reference spectral radiance of the incandescent reference light based on the measured spectral radiance at the wavelength of the monochromatic reference lights. This arrangement enables to correct, with high precision, the sensitivity fluctuation at each of the wavelengths in the wavelength range to be measured by the spectroradiometer, based on the reference spectral radiance of the incandescent reference light, without depending on approximation function.

A spectroradiometer is calibrated using the above-described calibration source by turning on the monochromatic sources, measuring the monochromatic reference light emitted from the reference light emitter by the spectroradiometer to output a spectral radiance of the monochromatic reference light, measuring the reference intensity of the monochromatic reference light emitted from the reference light emitter by the sensor to calculate a reference spectral radiance of the monochromatic reference light based on the measurement result, and correcting a sensitivity of the spectroradiometer with respect to a wavelength of the monochromatic reference light, based on the spectral radiance and the reference spectral radiance of the monochromatic reference light.

With this calibration method, fluctuation of a relative spectral intensity, which is one of the fluctuation factors of the calibration source, can be avoided by using the monochromatic reference light originated from the monochromatic source free from wavelength fluctuation. Also, the monochromatic reference light is measured by the spectroradiometer, with the fluctuation of the spectral radiance being monitored simultaneously by the reference sensor with high precision.

Since sensitivity fluctuation at the wavelength of the monochromatic reference light can be measured with high precision, the user can easily and accurately calibrate the spectroradiometer.

Preferably, the calibration method may be further performed by calculating a sensitivity correction factor for correcting a sensitivity fluctuation of the spectroradiometer at the wavelength of the monochromatic reference light, based on the spectral radiance and the reference spectral radiance of the monochromatic reference light, and correcting the sensitivity of the spectroradiometer using the calculated sensitivity correction factor.

The sensitivity fluctuation at the wavelength of the monochromatic reference light can be corrected by using the sensitivity correction factor with respect to the wavelength of the monochromatic reference light.

The calibration method may be preferably performed by calculating the sensitivity correction factor with respect to each of the monochromatic reference lights having the wavelengths different from each other, and estimating a sensitivity correction factor with respect to each of the wavelengths in a wavelength range to be measured by the spectroradiometer using an approximation function, based on the calculated sensitivity correction factor with respect to each of the wavelengths of the monochromatic reference lights.

In this calibration method, fluctuation of spectral sensitivity after the initial calibration or previous calibration of the spectroradiometer can be approximated by the approximation function which is estimated based on the fluctuation at each of the wavelengths of the monochromatic reference lights. Accordingly, the sensitivity fluctuations at all wavelengths in the wavelength range to be measured by the spectroradiometer can be precisely estimated and corrected.

In the case where the calibration source includes an incandescent source for emitting incandescent light, and the reference light emitter emits incandescent reference light by receiving the incandescent light emitted from the incandescent source, preferably, the calibration method may be further performed by calculating the sensitivity correction factor with respect to each of the monochromatic reference lights having the wavelengths different from each other, turning on the incandescent source, measuring a spectral radiance of the incandescent reference light emitted from the reference light emitter by the spectroradiometer, outputting a spectral radiance at each of the wavelengths of the monochromatic reference lights corresponding to the measured spectral radiance of the incandescent reference light, calculating a corrected spectral radiance at each of the wavelengths of the monochromatic reference lights by multiplying the spectral radiance by the sensitivity correction factor, estimating a reference spectral radiance of the incandescent reference light based on the corrected spectral radiances, and estimating a sensitivity correction factor with respect to each of the wavelengths in a wavelength range to be measured by the spectroradiometer, based on the estimated reference spectral radiance of the incandescent reference light, and the measured spectral radiance of the incandescent reference light.

In this calibration method, the spectral radiance of the incandescent reference light originated from the incandescent source is measured by the spectroradiometer whose correction factor has been calculated with respect to each of the wavelengths of the monochromatic reference lights to estimate the reference spectral radiance of the incandescent reference light based on the corrected spectral radiances which have been corrected at the wavelengths using the correction factors. Sensitivity fluctuation at each of the wavelengths in the wavelength range to be measured by the spectroradiometer can be corrected, with high precision, based on the estimated reference spectral radiance of the incandescent reference light, without depending on approximation function. Thus, fluctuation of a spectral sensitivity which cannot be approximated using the function approximation can be precisely corrected. The spectroradiometer can be accurately calibrated.

Preferably, the calibration method may be further performed by estimating a color temperature and a radiant intensity of the incandescent reference light based on the corrected spectral radiances, and estimating the reference spectral radiance of the incandescent reference light based on the estimated color temperature and the estimated radiant intensity of the incandescent reference light.

In this calibration method, the spectral radiance of the incandescent reference light originated from the incandescent source is measured by the spectroradiometer whose correction factor has been calculated with respect to each of the wavelengths of the monochromatic reference lights to estimate the color temperature and the radiant intensity of the incandescent reference light based on the corrected spectral radiances which have corrected at the wavelengths using the correction factors. Also, the reference spectral radiance of the incandescent reference light can be precisely estimated based on the estimated color temperature and the estimated radiant intensity of the incandescent reference light.

Since the reference spectral radiance of the incandescent reference light can be precisely estimated, the spectroradiometer can be precisely calibrated for the whole range of the wavelengths to be measured.

Preferably, the calibration method may be further performed by estimating a center wavelength of the monochromatic reference light based on the spectral radiance of the monochromatic reference light, calculating a wavelength shift amount at the center wavelength of the monochromatic reference light by comparing the estimated center wavelength with a given reference center wavelength, and estimating a wavelength shift amount at each of the wavelengths in a wavelength range to be measured by the spectroradiometer, based on the wavelength shift amount at the center wavelength of the monochromatic reference light.

In this calibration method, the spectral sensitivity fluctuation after the previous calibration of the spectroradiometer can be corrected, and the wavelength fluctuation can be estimated and corrected based on the spectral radiance of the monochromatic reference light measured by the spectroradiometer. This arrangement enables to maintain the precision of the spectroradiometer in total.

A calibration system comprises the above-mentioned calibration source, a spectroradiometer, and a computer for controlling calibration, and a computer-readable recording medium storing a program which causes the computer to execute turning on the monochromatic sources, measuring the monochromatic reference light emitted from the reference light emitter by the spectroradiometer to output a spectral radiance of the monochromatic reference light based on the measurement result, measuring the reference intensity of the monochromatic reference light emitted from the reference light emitter by the sensor to output a reference spectral radiance of the monochromatic reference light based on the measurement result, and correcting a sensitivity of the spectroradiometer at the wavelengths of the monochromatic reference light, based on the spectral radiance and the reference spectral radiance of the monochromatic reference light.

Preferably, the program may be further provided with contents to cause the computer to execute the operations mentioned in the above-mentioned calibration method.

It will be seen that the calibration systems have the same advantageous effects as the calibration source and the calibration method.

Further, it should be noted that in general, the routines executed to implement the embodiment of the invention, whether implemented as part of an operating system or a specific application, component, program, object, module or sequence of instructions will be referred to as "programs". The program comprises one or more instructions that are resident at various times in various memory and storage devices in a computer, and that cause the computer to perform the steps necessary to execute steps or elements embodying the various aspects of the invention.

The embodiment of the invention has and will be described in the context of functioning the computer and computer system. However, those skilled in the art will appreciate that various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A calibration source for calibrating a spectroradiometer comprising:
    a plurality of monochromatic sources for emitting monochromatic light having different wavelengths from each other, respectively;
    a reference light emitter for emitting monochromatic reference light by receiving the monochromatic light emitted from the monochromatic sources;
    a sensor for measuring a reference intensity of the monochromatic reference light emitted from the reference light emitter; and
    a controller for controlling the emission of the monochromatic light by the monochromatic sources, and the measurement of the reference intensity of the monochromatic reference light by the sensor.

2. The calibration source according to claim 1, wherein
    the reference light emitter includes an integrating sphere having incident apertures for allowing the monochromatic light to enter, respectively, and an exit aperture for allowing the monochromatic reference light to exit by iterative reflection of the incident monochromatic light, and
    the sensor measures intensities of the monochromatic light iteratively reflected by the integrating sphere.

3. The calibration source according to claim 1, wherein
    at least one of the monochromatic sources is a semiconductor laser, and
    the calibration source includes a temperature controller for controlling a temperature of the semiconductor laser.

4. The calibration source according to claim 1, wherein
    the sensor includes a single semiconductor photo detector, and
    the photo detector has a photosensitive surface for directly receiving a monitoring light of the monochromatic reference light without intervening of a filter.

5. The calibration source according to claim 1, further comprising an incandescent source for emitting incandescent light, wherein
    the reference light emitter emits incandescent reference light by receiving the incandescent light emitted from the incandescent source.

6. A method for calibrating a spectroradiometer using a calibration source provided with a plurality of monochromatic sources for emitting monochromatic light having different wavelengths from each other, respectively, a reference light emitter for emitting monochromatic reference light by receiving the monochromatic light emitted from the monochromatic sources, a sensor for measuring a reference intensity of the monochromatic reference light emitted from the reference light emitter, and a controller for controlling the emission of the monochromatic light by the monochromatic sources, and the measurement of the reference intensity of the monochromatic reference light by the sensor, the calibration method comprising the steps of:
    turning on the monochromatic sources;
    measuring the monochromatic reference light emitted from the reference light emitter by the spectroradiometer to output a spectral radiance of the monochromatic reference light;
    measuring the reference intensity of the monochromatic reference light emitted from the reference light emitter by the sensor to calculate a reference spectral radiance of the monochromatic reference light based on the measurement result; and
    correcting a sensitivity of the spectroradiometer at the wavelength of the monochromatic reference light, based on the spectral radiance and the reference spectral radiance of the monochromatic reference light.

7. The calibration method according to claim 6, further comprising the steps of:
    calculating a sensitivity correction factor for correcting a sensitivity fluctuation of the spectroradiometer with respect to the wavelength of the monochromatic reference light, based on the spectral radiance and the reference spectral radiance of the monochromatic reference light; and
    correcting the sensitivity of the spectroradiometer using the calculated sensitivity correction factor.

8. The calibration method according to claim 7, further comprising the steps of:
    calculating the sensitivity correction factor with respect to each of the monochromatic reference lights having the wavelengths different from each other; and
    estimating a sensitivity correction factor with respect to each of the wavelengths in a wavelength range to be measured by the spectroradiometer using an approximation function, based on the calculated sensitivity correction factor with respect to each of the wavelengths of the monochromatic reference light.

9. The calibration method according to claim 7, wherein the calibration source includes an incandescent source for emitting incandescent light, and the reference light emitter emits incandescent reference light by receiving the incandescent light emitted from the incandescent source, the calibration method further comprising the steps of:
    calculating the sensitivity correction factor with respect to each of the monochromatic reference lights having the wavelengths different from each other;
    turning on the incandescent source;
    measuring a spectral radiance of the incandescent reference light emitted from the reference light emitter by the spectroradiometer;
    outputting a spectral radiance at each of the wavelengths of the monochromatic reference light corresponding to the measured spectral radiance of the incandescent reference light;

calculating a corrected spectral radiance at each of the wavelengths of the monochromatic reference light by multiplying the spectral radiance by the sensitivity correction factor;

estimating a reference spectral radiance of the incandescent reference light based on the corrected spectral radiances; and estimating a sensitivity correction factor with respect to each of the wavelengths in a wavelength range to be measured by the spectroradiometer, based on the estimated reference spectral radiance of the incandescent reference light, and the measured spectral radiance of the incandescent reference light.

10. The calibration method according to claim 9, further comprising the steps of:

estimating a color temperature and a radiant intensity of the incandescent reference light based on the corrected spectral radiances; and estimating the reference spectral radiance of the incandescent reference light based on the estimated color temperature and the estimated radiant intensity of the incandescent reference light.

11. The calibration method according to claim 6, further comprising the steps of:

estimating a center wavelength of the monochromatic reference light based on the spectral radiance of the monochromatic reference light;

calculating a wavelength shift amount at the center wavelength of the monochromatic reference light by comparing the estimated center wavelength with a given reference center wavelength; and estimating a wavelength shift amount at each of the wavelengths in a wavelength range to be measured by the spectroradiometer, based on the wavelength shift amount at the center wavelength of the monochromatic reference light.

12. A calibration system comprising:

a calibration source having:

a plurality of monochromatic sources for emitting monochromatic light having different wavelengths from each other, respectively, a reference light emitter for emitting monochromatic reference light by receiving the monochromatic light emitted from the monochromatic sources, a sensor for measuring a reference intensity of the monochromatic reference light emitted from the reference light emitter, and a controller for controlling the emission of the monochromatic light by the monochromatic sources, and the measurement of the reference intensity of the monochromatic reference light by the sensor;

a spectroradiometer to be calibrated;

a computer for controlling calibration; and a computer-readable recording medium storing a program which causes the computer to execute:

turning on the monochromatic sources;

measuring the monochromatic reference light emitted from the reference light emitter by the spectroradiometer to output a spectral radiance of the monochromatic reference light based on the measurement result;

measuring the reference intensity of the monochromatic reference light emitted from the reference light emitter by the sensor to output a reference spectral radiance of the monochromatic reference light based on the measurement result; and correcting a sensitivity of the spectroradiometer at the wavelength of the monochromatic reference light, based on the spectral radiance and the reference spectral radiance of the monochromatic reference light.

13. The calibration system according to claim 12, wherein the program further causes the computer to execute:

calculating a sensitivity correction factor for correcting a sensitivity fluctuation of the spectroradiometer at the wavelength of the monochromatic reference light, based on the spectral radiance and the reference spectral radiance of the monochromatic reference light; and correcting the sensitivity of the spectroradiometer using the calculated sensitivity correction factor.

14. The calibration system according to claim 13, wherein the program further causes the computer to execute:

calculating the sensitivity correction factor with respect to each of the monochromatic reference lights having the wavelengths different from each other; and estimating a sensitivity correction factor with respect to each of the wavelengths in a wavelength range to be measured by the spectroradiometer using an approximation function, based on the calculated sensitivity correction factor with respect to each of the wavelengths of the monochromatic reference light.

15. The calibration system according to claim 13, wherein the calibration source includes an incandescent source for emitting incandescent light, and the reference light emitter emits incandescent reference light by receiving the incandescent light emitted from the incandescent source, the program further causes the computer to execute:

calculating the sensitivity correction factor with respect to each of the monochromatic reference lights having the wavelengths different from each other;

turning on the incandescent source;

measuring a spectral radiance of the incandescent reference light emitted from the reference light emitter by the spectroradiometer;

calculating a corrected spectral radiance at each of the wavelengths of the monochromatic reference light by multiplying the spectral radiance at each of the wavelengths of the monochromatic reference light corresponding to the measured spectral radiance of the incandescent reference light by the sensitivity correction factor;

estimating a reference spectral radiance of the incandescent reference light based on the corrected spectral radiances of the monochromatic reference light; and estimating a sensitivity correction factor with respect to each of the wavelengths in a wavelength range to be measured by the spectroradiometer, based on the estimated reference spectral radiance of the incandescent reference light, and the measured spectral radiance of the incandescent reference light.

16. The calibration system according to claim 15, wherein the program further causes the computer to execute:

estimating a color temperature and a radiant intensity of the incandescent reference light based on the corrected spectral radiances of the monochromatic reference light; and estimating the reference spectral radiance of the incandescent reference light based on the estimated color temperature and the estimated radiant intensity of the incandescent reference light.

17. The calibration system according to claim 12, wherein the program further causes the computer to execute:
  estimating a center wavelength of the monochromatic reference light based on the spectral radiance of the monochromatic reference light;
  calculating a wavelength shift amount at the center wavelength of the monochromatic reference light by comparing the estimated center wavelength with a given reference center wavelength; and
  estimating a wavelength shift amount at each of the wavelengths in a wavelength range to be measured by the spectroradiometer, based on the wavelength shift amount at the center wavelength of the monochromatic reference light.

* * * * *